(12) United States Patent
Ashourian et al.

(10) Patent No.: US 9,615,601 B2
(45) Date of Patent: Apr. 11, 2017

(54) PROCESS FOR THE CONTROLLED INTRODUCTION OF OIL INTO FOOD PRODUCTS

(71) Applicant: JimmyAsh LLC, Bakersfield, CA (US)

(72) Inventors: Jamshid Ashourian, Santa Monica, CA (US); Steven Phelps, Tigard, OR (US)

(73) Assignee: JimmyAsh LLC, Bakersfield, CA (US)

( * ) Notice: Subject to any disclaimer, the term of this patent is extended or adjusted under 35 U.S.C. 154(b) by 0 days.

(21) Appl. No.: 14/816,784

(22) Filed: Aug. 3, 2015

(65) Prior Publication Data

US 2015/0335047 A1 Nov. 26, 2015

Related U.S. Application Data

(60) Continuation-in-part of application No. 14/444,731, filed on Jul. 28, 2014, which is a division of application No. 14/055,994, filed on Oct. 17, 2013, now Pat. No. 8,980,353, which is a continuation of application No. 14/054,323, filed on Oct. 15, 2013, now Pat. No. 8,962,054, which is a continuation of application No. 12/090,845, filed as application No. PCT/US2006/038963 on Oct. 4, 2006, now Pat. No. 8,715,760, application No. 14/816,784, which is a continuation-in-part of application No. 14/613,577, filed on Feb. 4, 2015, which is a continuation of application No. 12/090,842, filed as application No. PCT/US2006/038966 on Oct. 4, 2006, now Pat. No. 8,980,350.

(60) Provisional application No. 60/723,880, filed on Oct. 4, 2005, provisional application No. 60/820,743, filed on Jul. 28, 2006, provisional application No. 60/723,881, filed on Oct. 4, 2005.

(51) Int. Cl.

| | | |
|---|---|---|
| *A23B 7/00* | (2006.01) | |
| *A23B 7/02* | (2006.01) | |
| *A23B 7/03* | (2006.01) | |
| *A23L 1/212* | (2006.01) | |
| *A23L 1/214* | (2006.01) | |
| *A23L 1/216* | (2006.01) | |
| *A23L 19/18* | (2016.01) | |
| *A23B 7/06* | (2006.01) | |
| *A23B 7/155* | (2006.01) | |
| *A23P 20/10* | (2016.01) | |
| *A23L 5/10* | (2016.01) | |
| *A23L 19/00* | (2016.01) | |
| *A23L 19/10* | (2016.01) | |

(52) U.S. Cl.
CPC ............... *A23L 19/18* (2016.08); *A23B 7/06* (2013.01); *A23B 7/155* (2013.01); *A23L 5/15* (2016.08); *A23L 19/03* (2016.08); *A23L 19/105* (2016.08); *A23P 20/11* (2016.08); *A23V 2002/00* (2013.01)

(58) Field of Classification Search
CPC ........ A23L 1/217; A23L 1/2125; A23L 1/212; A23L 1/216; A23L 1/2163; A23L 19/18; A23L 19/03; A23P 20/11
USPC ............................................ 426/443
See application file for complete search history.

(56) References Cited

U.S. PATENT DOCUMENTS

| | | |
|---|---|---|
| 585,843 A | 7/1897 | Girvin |
| 2,348,950 A | 5/1944 | Anderson |
| 2,801,083 A | 7/1957 | Balassa |
| 3,338,724 A | 8/1967 | Adler |
| 3,348,950 A | 10/1967 | Weiss |
| 3,436,229 A | 4/1969 | Simpson |
| 3,600,193 A | 8/1971 | Glabe et al. |
| 3,835,222 A | 9/1974 | Wisdom et al. |
| 3,922,370 A | 11/1975 | Prakash |
| 4,058,631 A | 11/1977 | Roan |
| 4,272,553 A | 6/1981 | Bengtsson et al. |
| 4,277,510 A | 7/1981 | Wicklund et al. |
| 4,511,583 A | 4/1985 | Olson et al. |
| 4,756,916 A | 7/1988 | Dreher et al. |
| 4,933,199 A | 6/1990 | Neel et al. |
| 5,004,616 A | 4/1991 | Shanbhag et al. |
| 5,059,435 A | 10/1991 | Sloan et al. |
| 5,061,507 A | 10/1991 | Aulik et al. |

(Continued)

FOREIGN PATENT DOCUMENTS

| | | |
|---|---|---|
| AU | 2006299381 B2 | 3/2013 |
| BY | 1917 C1 | 12/1997 |

(Continued)

OTHER PUBLICATIONS

"Crisp Coat UC", http://www.modernistpantry.com/crisp-coat-uc.html, obtained Jun. 30, 2016.*
U.S. Appl. No. 14/444,731, filed Jul. 28, 2014, Methods of Making Snack Food Products and Products Made Thereby.
U.S. Appl. No. 14/613,557, filed Feb. 4, 2015, Fried Food Products Having Reduced Fat Content.
"Australian Application Serial No. 2013202969, Examiner's Report mailed Nov. 21, 2014", 4 pgs.

(Continued)

*Primary Examiner* — Jeffrey Mornhinweg
(74) *Attorney, Agent, or Firm* — Schwegman Lundberg & Woessner, P.A.

(57) ABSTRACT

A process for the application of a predetermined amount of oil to food pieces comprises: (a) providing or receiving a plurality of cut or shaped food pieces; (b) applying an oil-water emulsion to the food pieces for a time sufficient to provide a predetermined amount of oil to the food pieces and so that the food pieces have an initial moisture level after applying the oil-water emulsion; and (c) reducing the initial moisture level, in the absence of frying in oil, to a moisture level of from about 0.2 to about 80% by weight to provide a cooked food product, comprising said predetermined amount of oil, wherein step (c) does not comprises frying the food pieces in hot oil.

17 Claims, No Drawings

(56) References Cited

U.S. PATENT DOCUMENTS

| | | |
|---|---|---|
| 5,141,759 A | 8/1992 | Sloan et al. |
| 5,292,540 A | 3/1994 | Laufer |
| 5,312,631 A | 5/1994 | Yamashita |
| 5,370,898 A | 12/1994 | Zussman |
| 5,399,015 A | 3/1995 | Zhi-qiang et al. |
| 5,441,748 A | 8/1995 | Moyiyasu |
| 5,441,758 A | 8/1995 | Lewis et al. |
| 5,470,600 A | 11/1995 | Petelle et al. |
| 5,498,438 A | 3/1996 | Strong et al. |
| 5,603,973 A | 2/1997 | Benson et al. |
| 5,700,508 A | 12/1997 | Makishima et al. |
| 5,858,431 A | 1/1999 | Wiedersatz |
| 5,972,397 A | 10/1999 | Durance et al. |
| 6,010,726 A | 1/2000 | Evans et al. |
| 6,290,999 B1 | 9/2001 | Gerrish et al. |
| 6,536,940 B1 | 3/2003 | Kolb et al. |
| 7,056,544 B2 | 6/2006 | Xu et al. |
| 7,696,252 B2 | 4/2010 | Pashley |
| 8,029,184 B2 | 10/2011 | Hoogland |
| 8,267,572 B2 | 9/2012 | Windhab et al. |
| 8,592,351 B2 | 11/2013 | Kaminsky |
| 8,703,226 B2 | 4/2014 | Bortone et al. |
| 8,715,760 B2 | 5/2014 | Ashourian et al. |
| 8,784,848 B2 | 7/2014 | Desjardins-Lavisse |
| 8,815,257 B2 | 8/2014 | Braksmayer et al. |
| 8,962,054 B2 | 2/2015 | Ashourian et al. |
| 8,980,350 B2 | 3/2015 | Ashourian et al. |
| 8,980,353 B2 | 3/2015 | Ashourian et al. |
| 2002/0004085 A1 | 1/2002 | Xu et al. |
| 2004/0058046 A1 | 3/2004 | Zyzak et al. |
| 2004/0101607 A1 | 5/2004 | Zyzak et al. |
| 2004/0121046 A1 | 6/2004 | Dihel |
| 2005/0106296 A1 | 5/2005 | Merrill |
| 2008/0026122 A1 | 1/2008 | Bows et al. |
| 2009/0192068 A1 | 7/2009 | Ogasawara et al. |
| 2009/0304865 A1 | 12/2009 | Ashourian et al. |
| 2010/0310712 A1 | 12/2010 | Ashourian et al. |
| 2014/0044833 A1 | 2/2014 | Ashourian et al. |
| 2014/0057020 A1 | 2/2014 | Ashourian et al. |
| 2014/0335249 A1 | 11/2014 | Ashourian et al. |
| 2015/0150284 A1 | 6/2015 | Ashourian et al. |

FOREIGN PATENT DOCUMENTS

| | | |
|---|---|---|
| CA | 2624753 C | 2/2014 |
| CN | 1020469 C | 5/1993 |
| CN | 1543851 A | 11/2004 |
| CN | 1554274 A | 12/2004 |
| CN | 203494459 U | 5/2014 |
| DE | 202006021057 U1 | 5/2012 |
| EA | 015313 B1 | 6/2011 |
| EP | 1430788 A1 | 6/2004 |
| JP | 4955859 A | 5/1974 |
| JP | 49055859 A | 5/1974 |
| JP | 54163847 A | 12/1979 |
| JP | 216938 A | 1/1990 |
| JP | 690681 A | 4/1994 |
| JP | 6508518 A | 9/1994 |
| JP | 9206016 A | 8/1997 |
| JP | 10136928 A | 5/1998 |
| JP | 11508454 A | 7/1999 |
| JP | 2000511763 A | 9/2000 |
| JP | 2001510686 A | 8/2001 |
| JP | 2003135014 A | 5/2003 |
| JP | 2004033139 A | 2/2004 |
| JP | 2004521651 A | 7/2004 |
| JP | 2004357592 A | 12/2004 |
| JP | 2008534680 A | 8/2008 |
| JP | 2009509567 A | 3/2009 |
| JP | 5014348 B2 | 6/2012 |
| JP | 5438969 B2 | 12/2013 |
| JP | 201436664 A | 2/2014 |
| NZ | 567259 | 11/2011 |
| RU | 1762871 A1 | 9/1992 |
| RU | 95117559 A | 4/1998 |
| RU | 2170033 C2 | 7/2001 |
| WO | WO-9857554 A1 | 12/1998 |
| WO | WO-0178524 A2 | 10/2001 |
| WO | WO-0215715 A1 | 2/2002 |
| WO | WO 03/026443 A1 * | 4/2003 ............ A23L 1/216 |
| WO | WO-2004047542 A1 | 6/2004 |
| WO | WO-2005041685 A2 | 5/2005 |
| WO | WO-2005053434 A1 | 6/2005 |
| WO | WO-2007041679 A2 | 4/2007 |
| WO | WO-2007041679 A3 | 4/2007 |
| WO | WO-2007041682 A1 | 4/2007 |
| WO | WO-2009117192 A1 | 9/2009 |
| WO | WO-2013072056 A1 | 5/2013 |
| WO | WO-2013098673 A1 | 7/2013 |

OTHER PUBLICATIONS

"Australian Application Serial No. 2013202969,Response filed Jul. 20, 2015 to Examiner's Report mailed Nov. 21, 2014", 29 pgs.

"Canadian Application Serial No. 2,624,725, Office Action mailed Apr. 10, 2015", 4 pgs.

"Chinese Application Serial No. 201210343055.3, Office Action mailed Jun. 24, 2015", w/ English Translation, 7 pgs.

"Israeli Application Serial No. 190607, Office Action mailed Jun. 28, 2015", w/ English Claims, 6 pgs.

"Israeli Application Serial No. 190607,Response filed Aug. 18, 2015 to Office Action mailed Jun. 28, 2015", w/ English Translation, 8 pgs.

"Japanese Application Serial No. 2013-218466, Office Action mailed Jul. 28, 2015", w/ English Translation, 6 pgs.

"U.S. Appl. No. 12/090,842, Advisory Action mailed Apr. 11, 2014", 6 pgs.

"U.S. Appl. No. 12/090,842, Examiner Interview Summary mailed Apr. 11, 2014", 2 pgs.

"U.S. Appl. No. 12/090,842, Final Office Action mailed Jan. 16, 2014", 12 pgs.

"U.S. Appl. No. 12/090,842, Non Final Office Action mailed Mar. 28, 2013", 12 pgs.

"U.S. Appl. No. 12/090,842, Non Final Office Action mailed Jun. 22, 2012", 13 pgs.

"U.S. Appl. No. 12/090,842, Notice of Allowance mailed Nov. 4, 2014", 14 pgs.

"U.S. Appl. No. 12/090,842, Preliminary Amendment filed Apr. 18, 2008", 4 pgs.

"U.S. Appl. No. 12/090,842, Response filed Mar. 12, 2014 to Final Office Action mailed Jan. 16, 2014", 13 pgs.

"U.S. Appl. No. 12/090,842, Response filed Jul. 16, 2014 to Final Office Action mailed Jan. 16, 2014", 15 pgs.

"U.S. Appl. No. 12/090,842, Response filed Sep. 30, 2013 to Non Final Office Action mailed Mar. 28, 2013", 17 pgs.

"U.S. Appl. No. 12/090,842, Response filed Dec. 21, 2012 to Non Final Office Action mailed Jun. 22, 2012", 19 pgs.

"U.S. Appl. No. 12/090,842, Supplemental Amendment filed Aug. 7, 2014", 8 pgs.

"U.S. Appl. No. 12/090,845, Advisory Action mailed Jul. 25, 2013", 3 pgs.

"U.S. Appl. No. 12/090,845, Examiner Interview Summary mailed Feb. 12, 2014", 3 pgs.

"U.S. Appl. No. 12/090,845, Examiner Interview Summary mailed Jun. 20, 2013", 4 pgs.

"U.S. Appl. No. 12/090,845, Final Office Action mailed May 8, 2013", 30 pgs.

"U.S. Appl. No. 12/090,845, Final Office Action mailed Dec. 7, 2011", 31 pgs.

"U.S. Appl. No. 12/090,845, Non Final Office Action mailed Jun. 9, 2011", 42 pgs.

"U.S. Appl. No. 12/090,845, Non Final Office Action mailed Jul. 6, 2012", 36 pgs.

"U.S. Appl. No. 12/090,845, Non Final Office Action mailed Dec. 6, 2013", 38 pgs.

"U.S. Appl. No. 12/090,845, Non Final Office Action mailed Dec. 19, 2013", 38 pgs.

"U.S. Appl. No. 12/090,845, Notice of Allowance mailed Mar. 14, 2014", 13 pgs.

(56) References Cited

OTHER PUBLICATIONS

"U.S. Appl. No. 12/090,845, Preliminary Amendment filed Oct. 30, 2013", 10 pgs.
"U.S. Appl. No. 12/090,845, Preliminary Amendment mailed Jan. 30, 2009", 25 pgs.
"U.S. Appl. No. 12/090,845, Preliminary Amendment mailed Apr. 18, 2008", 17 pgs.
"U.S. Appl. No. 12/090,845, Response filed Jan. 7, 2013 to Office Action mailed Jul. 6, 2012", 18 pgs.
"U.S. Appl. No. 12/090,845, Response Filed Feb. 7, 2014 to Non Final Office Action mailed Dec. 19, 2013", 13 pgs.
"U.S. Appl. No. 12/090,845, Response filed Mar. 5, 2012 to Final Office Action mailed Dec. 7, 2011", 22 pgs.
"U.S. Appl. No. 12/090,845, Response filed Jul. 5, 2013 to Final Office Action mailed May 8, 2013", 21 pgs.
"U.S. Appl. No. 12/090,845, Second Preliminary Amendment filed Apr. 15, 2011", 25 pgs.
"U.S. Appl. No. 12/090.845, Response filed Feb. 10, 2014 to Non Final Office Action mailed Dec. 19, 2013", 14 pgs.
"U.S. Appl. No. 12/090,845, Response filed Sep. 20, 2011 to Non Final Office Action mailed Jun. 9, 2011", 24 pgs.
"U.S. Appl. No. 14/054,323, Examiner Interview Summary mailed May 27, 2014", 3 pgs.
"U.S. Appl. No. 14/054,323, Final Office Action mailed Oct. 6, 2014", 15 pgs.
"U.S. Appl. No. 14/054,323, Non Final Office Action mailed Feb. 27, 2014", 19 pgs.
"U.S. Appl. No. 14/054,323, Notice of Allowance mailed Nov. 10, 2014", 8 pgs.
"U.S. Appl. No. 14/054,323, Preliminary Amendment filed Jan. 31, 2014", 8 pgs.
"U.S. Appl. No. 14/054,323, Response filed May 27, 2014 to Non Final Office Action mailed Feb. 27, 2014", 15 pgs.
"U.S. Appl. No. 14/054,323, Response filed Oct. 21, 2014 to Final Office Action mailed Oct. 6, 2014", 8 pgs.
"U.S. Appl. No. 14/054,323, Supplemental Amendment filed Jun. 30, 2014", 5 pgs.
"U.S. Appl. No. 14/055,994, Examiner Interview Summary mailed May 13, 2014", 4 pgs.
"U.S. Appl. No. 14/055,994, Final Office Action mailed Oct. 6, 2014", 26 pgs.
"U.S. Appl. No. 14/055,994, Non Final Office Action mailed Feb. 12, 2014", 20 pgs.
"U.S. Appl. No. 14/055,994, Notice of Allowance mailed Nov. 7, 2014", 9 pgs.
"U.S. Appl. No. 14/055,994, Preliminary Amendment filed Jan. 31, 2014", 7 pgs.
"U.S. Appl. No. 14/055,994, Preliminary Amendment mailed Jun. 30, 2014", 11 pgs.
"U.S. Appl. No. 14/055,994, Response filed May 12, 2014 to Non Final Office Action mailed Feb. 12, 2014", 17 pgs.
"U.S. Appl. No. 14/055,994, Response filed Oct. 27, 2014 to Final Office Action mailed Oct. 6, 2014.", 10 pgs.
"U.S. Appl. No. 14/444,731, Advisory Action mailed Jun. 15, 2015", 12 pgs.
"U.S. Appl. No. 14/444,731, Final Office Action mailed Feb. 20, 2015", 16 pgs.
"U.S. Appl. No. 14/444,731, Non-Final Office Action mailed Oct. 6, 2014", 12 pgs.
"U.S. Appl. No. 14/444,731, Pre-Appeal Brief Request filed Jun. 22, 2015", 5 pgs.
"U.S. Appl. No. 14/444,731, Preliminary Amendment mailed Jul. 31, 2014", 8 pgs.
"U.S. Appl. No. 14/444,731, Response filed May 19, 2015 to Final Office Action mailed Feb. 20, 2015", 10 pgs.
"U.S. Appl. No. 14/444,731, Response filed Dec. 29, 2014 to Non-Final Office Action mailed Oct. 6, 2014", 8 pgs.
"U.S. Appl. No. 14/613,577, Non Final Office Action mailed Apr. 6, 2015", 11 pgs.
"U.S. Appl. No. 14/613,577, Preliminary Amendment filed Feb. 4, 2015", 3 pgs.
"U.S. Appl. No. 14/613,577, Response filed Jul. 6, 2015 to Non Final Office Action mailed Apr. 6, 2015", 9 pgs.
"Australian Application Serial No. 2006299381, First Examiner Report mailed Aug. 9, 2011", 4 pgs.
"Australian Application Serial No. 2006299381, Response Sep. 28, 2012 to Office Action mailed Aug. 9, 2011", 23 pgs.
"Australian Application Serial No. 2006299381, Response filed Jan. 15, 2013 to Office Action mailed Oct. 26, 2012", 18 pgs.
"Australian Application Serial No. 2006299381, Subsequent Examiner Report mailed Oct. 26, 2012", 3 pgs.
"Canadian Application Serial No. 2,624,725, Office Action mailed Feb. 19, 2014".
"Canadian Application Serial No. 2,624,725, Office Action mailed Jun. 13, 2013", 2 pgs.
"Canadian Application Serial No. 2,624,725, Office Action mailed Oct. 18, 2012", 2 pgs.
"Canadian Application Serial No. 2,624,725, Response filed Apr. 18, 2013 to Office Action mailed Oct. 18, 2012", 17 pgs.
"Canadian Application Serial No. 2,624,725, Response filed May 15, 2014 to Office Action mailed Feb. 19, 2014", 29 pgs.
"Canadian Application Serial No. 2,624,725, Response filed Dec. 20, 2013 to Office Action mailed Jun. 13, 2013", 17 pgs.
"Canadian Application Serial No. 2,624,725, Voluntary Amendment filed Dec. 4, 2014", 11 pgs.
"Canadian Application Serial No. 2,624,753, Office Action mailed Jan. 4, 2013", 4 pgs.
"Canadian Application Serial No. 2,624,753, Response filed Jul. 4, 2013 to Office Action mailed Jan. 4, 2013", 21 pgs.
"Chinese Application Serial No. 200680045507.2, Notification of Decision to Grant mailed Jun. 29, 2012", w/English translation, 9 pgs.
"Chinese Application Serial No. 200680045507.2, Office Action mailed Mar. 9, 2011", w/English translation, 7 pgs.
"Chinese Application Serial No. 200680045507.2, Office Action mailed Sep. 9, 2010", w/English translation, 9 pgs.
"Chinese Application Serial No. 200680045507.2, Office Action mailed Dec. 2, 2011", w/English Translation, 6 pgs.
"Chinese Application Serial No. 200680045507.2, Office Action mailed Aug. 31, 2011", w/ English translation, 6 pgs.
"Chinese Application Serial No. 200680045507.2, Response filed Jan. 6, 2012 to Office Action mailed Dec. 2, 2011", w/English claims, 9 pgs.
"Chinese Application Serial No. 200680045507.2, Response filed Jan. 24, 2011 to Office Action mailed Sep. 9, 2010", w/English claims, 15 pgs.
"Chinese Application Serial No. 200680045507.2, Response filed Jul. 22, 2011 to Office Action mailed Mar. 9, 2011", w/English claims, 13 pgs.
"Chinese Application Serial No. 200680045507.2, Response filed Nov. 15, 2011 to Office Action mailed Aug. 31, 2011", w/English claims, 9 pgs.
"Chinese Application Serial No. 201210343055.3, Office Action mailed Jul. 3, 2014", w/English Translation, 37 pgs.
"Chinese Application Serial No. 201210343055.3, Office Action mailed Sep. 17, 2013", w/English translation, 13 pgs.
"Chinese Application Serial No. 201210343055.3, Office Action mailed Dec. 24, 2014", w/ English Translation, 19 pgs.
"Chinese Application Serial No. 201210343055.3, Response filed Apr. 2, 2014 to Office Action mailed Sep. 17, 2013", w/English claims, 22 pgs.
"Eurasian Application Serial No. 200870160, Decision to Grant mailed Apr. 21, 2011", 2 pgs.
"Eurasian Application Serial No. 200870160, Office Action mailed Nov. 6, 2009", 2 pgs.
"Eurasian Application Serial No. 200870160, Response filed Sep. 2, 2010", w/English claims, 16 pgs.
"Eurasian Application Serial No. 200870160, Search report mailed Jun. 25, 2009", 4 pgs.
"European Application Serial No. 06816321.1, Communication pursuant to Rules 161 and 162 EPC mailed May 21, 2008", 2 pgs.

(56) References Cited

OTHER PUBLICATIONS

"European Application Serial No. 06816321.1, Examination Notification Art. 94(3) mailed Apr. 3, 2014", 5 pgs.
"European Application Serial No. 06816321.1, Extended European Search Report mailed Dec. 3, 2012", 7 pgs.
"European Application Serial No. 06816321.1, Office Action mailed Jul. 17, 2013", 6 pgs.
"European Application Serial No. 06816321.1, Response filed Jul. 30, 2014 to Office Action mailed Apr. 3, 2014", 12 pgs.
"European Application Serial No. 06816321.1, Response filed Nov. 28, 2013 to Office Action mailed Jul. 17, 2013", 12 pgs.
"European Application Serial No. 06816321.1, Response filed Dec. 28, 2012 to Extended European Search Report mailed Dec. 3, 2012", 22 pgs.
"European Application Serial No. 06816324.5, Examination Notification Art. 94(3) mailed Jun. 24, 2014", 7 pgs.
"European Application Serial No. 06816324.5, Examination Notification Art. 94(3) mailed Dec. 1, 2014", 5 pgs.
"European Application Serial No. 06816324.5, Examination Notification Art. 94(3) mailed Dec. 20, 2013", 5 pgs.
"European Application Serial No. 06816324.5, Extended European Search Report mailed Jul. 27, 2012", 8 pgs.
"European Application Serial No. 06816324.5, Office Action mailed Jun. 25, 2013", 6 pgs.
"European Application Serial No. 06816324.5, Office Action mailed Aug. 14, 2012", 1 pg.
"European Application Serial No. 06816324.5, Response filed Feb. 25, 2013 to Extended European Search Report mailed Jul. 27, 2012", 16 pgs.
"European Application Serial No. 06816324.5, Response filed Apr. 29, 2014 to Examination Notification Art. 94(3) mailed Dec. 20, 2013", 10 pgs.
"European Application Serial No. 06816324.5, Response filed May 30, 2015 to Examination Notification Art. 94(3) mailed Dec. 1, 2014", 6 pgs.
"European Application Serial No. 06816324.5, Response filed Nov. 4, 2014 to Examination Notification Art. 94(3) mailed Jun. 24, 2014", 9 pgs.
"European Application Serial No. 06816324.5, Response filed Nov. 5, 2013 to Office Action mailed Jun. 25, 2013", English translation, 14 pgs.
"German Application Serial No. 20 2006 021 057.1, Response filed May 2, 2012 to Office Action mailed Feb. 28, 2012", w/English Claims, 83 pgs.
"India Application Serial No. 3143/DELNP/2008, Office Action mailed Aug. 1, 2013", 2 pgs.
"Indian Application Serial No. 3050/DELNP/2008, First Examiner Report mailed Aug. 29, 2013", 3 pgs.
"Indian Application Serial No. 3050/DELNP/2008, Response filed Apr. 7, 2014 to First Examiner Report mailed Aug. 29, 2013", 9 pgs.
"Indian Application Serial No. 3143/DELNP/2008, Response filed Jul. 4, 2014 to Office Action mailed Aug. 1, 2013", 25 pgs.
"International Application Serial No. PCT/US2006/038963, International Preliminary Report on Patentability mailed Apr. 8, 2008", 4 pgs.
"International Application Serial No. PCT/US2006/038963, International Search Report mailed Mar. 14, 2007", 1 pg.
"International Application Serial No. PCT/US2006/038963, Written Opinion mailed Mar. 14, 2007", 3 pgs.
"International Application Serial No. PCT/US2006/038966, International Preliminary Report on Patentability mailed Jun. 28, 2007", 10 pgs.
"International Application Serial No. PCT/US2006/038966, International Search Report mailed Jan. 19, 2007", 1 pg.
"International Application Serial No. PCT/US2006/038966, Written Opinion mailed Jan. 19, 2007", 3 pgs.
"Israel Application Serial No. 190606, Office Action mailed Jan. 25, 2011", 1 pg.
"Israel Application Serial No. 190606, Office Action mailed Feb. 11, 2013", 2 pgs.
"Israel Application Serial No. 190606, Office Action mailed Jul. 9, 2014", 2 pgs.
"Israel Application Serial No. 190606, Response filed Mar. 19, 2015 to Office Action mailed Jul. 9, 2014", W/ English Claims, 7 pgs.
"Israel Application Serial No. 190606, Response filed Aug. 11, 2013", w/ English Claims, 13 pgs.
"Israel Application Serial No. 190606, Response filed Dec. 12, 2011 to Office Action mailed Feb. 14, 2011", w/ English Claims, 8 pgs.
"Israel Application Serial No. 233409, Office Action mailed Feb. 5, 2015", 3 pgs.
"Israel Application Serial No. 233409,Response filed Jun. 7, 2015 to Office Action mailed Feb. 5, 2015", w/ English Claims, 55 pgs.
"Israeli Application Serial No. 190607, Office Action mailed Jan. 25, 2011", 1 Pg.
"Israeli Application Serial No. 190607, Office Action mailed May 21, 2014", 2 pgs.
"Israeli Application Serial No. 190607, Office Action mailed Sep. 27, 2012", 2 pgs.
"Israeli Application Serial No. 190607, Office Action Response filed Aug. 25, 2011 to Office Action mailed Jan. 25, 2011", 3 pgs.
"Israeli Application Serial No. 190607, Response filed Apr. 2, 2013 to Office Action mailed Sep. 27, 2012", English translation, 11 pgs.
"Israeli Application Serial No. 190607, Response filed Aug. 19, 2014 to Office Action mailed May 21, 2014", 4 pgs.
"Israeli Application Serial No. 233409, Office Action mailed Jul. 10, 2014", 2 pgs.
"Japanese Application Serial No. 2008-5344681, Office Action mailed Jun. 19, 2012", w/English translation, 8 pgs.
"Japanese Application Serial No. 2008-534680, Amendment filed Apr. 10, 2012", with English translation, 6 Pgs.
"Japanese Application Serial No. 2008-534680, Notice of Allowance mailed May 8, 2012", with English translation, 4 pgs.
"Japanese Application Serial No. 2008-534680, Office Action mailed Jan. 17, 2012", with English translation of claims, 4 pgs.
"Japanese Application Serial No. 2008-534680, Office Action mailed Feb. 22, 2011", with English translation of claims, 11 pgs.
"Japanese Application Serial No. 2008-534680, Response Filed Aug. 22, 2011 to Office Action mailed Feb. 22, 2011", with English translation of claims, 73 pgs.
"Japanese Application Serial No. 2008-534681, Office Action mailed Apr. 30, 2013", w/English Translation, 8 pgs.
"Japanese Application Serial No. 2008-534681, Response filed Oct. 29, 2013 to Office Action mailed Apr. 30, 2013", w/English amendment, 8 pgs.
"Japanese Application Serial No. 2008-534681, Response filed Dec. 19, 2012", w/English translation, 8 pgs.
"Japanese Application Serial No. 2008/534681, Office Action mailed Jul. 12, 2011", w/English translation, 9 pgs.
"Japanese Application Serial No. 2008/534681, Response filed Dec. 26, 2011 to Office Action Jul. 12, 2011", w/English Translation, 13 pgs.
"Japanese Application Serial No. 2011-180840, Amendment filed May 8, 2012", w/English translation, 11 pgs.
"Japanese Application Serial No. 2011-180840, Appeal filed Apr. 10, 2014", w/English claims, 21 pgs.
"Japanese Application Serial No. 2011-180840, Office Action mailed Jun. 18, 2013", w/English translation, 10 pgs.
"Japanese Application Serial No. 2011-180840, Office action mailed Dec. 17, 2013", w/English translation, 6 pgs.
"Japanese Application Serial No. 2011-180840, Response filed Oct. 21, 2013 to Office Action mailed Jun. 28, 2013", w/English translation of claims, 14 pgs.
"Japanese Application Serial No. 2012-277083, Office Action mailed Jun. 17, 2014", W/ English Tranlation, 12 pgs.
"Japanese Application Serial No. 2012-277083, Response filed Nov. 4, 2014 to Office Action mailed Jun. 17, 2014", W/ English Translation, 11 pgs.
"Japanese Application Serial No. 2012-277083, Voluntary Amendment filed Jan. 17, 2013", w/English translation, 7 pgs.
"Japanese Application Serial No. 2013-218466, Office Action mailed Dec. 24, 2014", w/ English Translation, 7 pgs.
"Mexican Application Serial No. MX/a/2008/004593, Office Action mailed Jul. 4, 2013".

(56) References Cited

OTHER PUBLICATIONS

"Mexican Application Serial No. MX/a/2008/004593, Office Action mailed Dec. 17, 2013", 2 pgs.
"Mexican Application Serial No. MX/a/2008/004593, Response filed Apr. 24, 2014 to Office Action mailed Dec. 17, 2013", 11 pgs.
"Mexican Application Serial No. MX/a/2008/004593, Response filed Aug. 5, 2013 to Office Action mailed Jul. 4, 2013", w/English claims, 22 pgs.
"Mexican Application Serial No. MX/a/2008/004595, Office Action mailed Jan. 16, 2014", 2 pgs.
"Mexican Application Serial No. MX/a/2008/004595, Office Action mailed Feb. 18, 2015", 4 pgs.
"Mexican Application Serial No. MX/a/2008/004595, Office Action mailed Jul. 18, 2013", 2 pgs.
"Mexican Application Serial No. MX/a/2008/004595, Office Action mailed Aug. 4, 2014", 6 pgs.
"Mexican Application Serial No. MX/a/2008/004595, Response filed Jan. 7, 2015 to Office Action mailed Jan. 16, 2014", W/ English Claims, 17 pgs.
"Mexican Application Serial No. MX/a/2008/004595, Response filed Apr. 14, 2014 to Office Action mailed Jan. 16, 2014", W/ English Claims, 6 pg.
"Mexican Application Serial No. MX/a/2008/004595, Response filed Jan. 25, 2015 to Office Action mailed Feb. 18, 2015", 8 pgs.
"Mexican Application Serial No. MX/a/2008/004595, Response filed Oct. 1, 2013 to Office Action mailed Jul. 18, 2013", W/ English Claims, 6 pgs.
"Modification of Physical and Barrier Properties of Edible Wheat Gluten-Based Films", Cereal Chem, vol. 70, (Jan. 1993), 426-429.
"New Zealand Application Serial No. 567259, First Examiner Report mailed Oct. 22, 2009", 2 pgs.
"New Zealand Application Serial No. 567259, Response filed Feb. 4, 2011 to First Examiner Report mailed Oct. 22, 2009", 3 pgs.
"New Zealand Application Serial No. 567259, Response filed May 18, 2011 to Subsequent Examiner Report mailed Feb. 22, 2011", 17 pgs.
"New Zealand Application Serial No. 567259, Subsequent Examiner Report mailed Feb. 22, 2011", 2 pgs.
"New Zealand Application Serial No. 567259, Examiner Report mailed Jun. 9, 2011", 2 pgs.
"New Zealand Application Serial No. 567259, Response filed Jun. 14, 2011 to Examiner Report mailed Jun. 9, 2011", 4 pgs.
"Science of Rice", Asakura Publishing Co., Ltd., First printing 4th issue, (Sep. 10, 1998), 21, 34-36.
"Science of Wheat", Asakura Publishing Co. Ltd., irst printing 3rd issue (Apr. 10, 1998), 97-100.
"Updated Frozen Food Dictionary", Asakura Publishing Co. Ltd., First printing 5th issue, See FIG. 5.2, 5.1.2e Heating Process, 5.1.3b Anti-bacterial growth in a process, FIG. 5.4, (Oct. 25, 1994), 150-165.
Akpinar, E., et al., "Single Layer drying behaviour of potato slices in a convective cyclone dryer and mathematical modeling", Energy Conversion and Management 44, (2003), 1689-1705.
Buffo, Roberto A, et al., "Chapter 17: Edible films and coatings from plant origin proteins", Innovation in Food Packaging, (2005), 277-300.
Cai, Y., et al., "Deep-Fried Technique of Vacuum Low-Temperature for Hamimelon Crisp Slice,", Science and Technology of Food Industry, No. 6, (1998), 59-60.
Guilbert, Stephane, et al., "Chapter 16: Agro-polymers for edible and biodegradable films: review of agricultural polymeric materials, physical and mechanical characteristics", Innovations in Food Packaging, (2005), 263-276.
Isabelle, Braccini, et al., "Molecular Basis of Ca 2+-Induced Gelation in Alginates and Pectins: The Egg-Box Model Revisited", Biomacromolecules, vol. 2, (Dec. 2001), 1089-1096.
Jeevitha, G. C, et al., "Electromagnetic Radiation-Based Dry Blanching of Red Bell Peppers: A Comparative Study", Journal of Food Process Engineering, 36(5), (Oct. 2013), 663-674.

Krochta, J. M, et al., "Edible and biodegradable polymer films: challenges and opportunities", Food Technology, 51(2), (1997), 61-74.
Liu, D., et al., "Research On Apple Chips with Vacuum Low-Temperature Puff", Journal of Ningxia Agricultural College, 21(2), (Jun. 30, 2000), 85-87.
Mohamed, Suhaila, et al., "Food Components Affecting the Oil Absorption and Crispness of Fried Batter", J Sci Food Agric, vol. 78, (1998), 39-45.
Nussinovitch, A., "Chapter 9: Hydrocolloids in the Production of Special Textures", Water-Soluble Polymer Applications in Foods, Blackwell Science Ltd, (Apr. 9, 2003), 196-206.
Nussinovitch, A., "Hydrocolloid coating of foods: a review", Leatherhead Food RA Food Industry Journal, 1(3), (1998), 174-188.
Olewnik, M, et al., "Factors Influencing Wheat Flour Performance in Batter Systems", Cereal Foods World, vol. 38, No. 9, (1993), 679-684.
Rayner, M, et al., "Development and application of soy-protein films to reduce fat intake in deep-fried foods", Journal of the Science of Food and Agriculture, vol. 80, (2000), 777-782.
Ruiz, Rennie P, "A1.1.1 Gravimetric Measurements of Water", Current Protocols in Food Analytical Chemistry, John Wiley & Sons, (Aug. 1, 2001), 2 pgs.
Ruiz, Rennie P, "Gravimetric Determination of Water by Drying and Weighing", Current Protocols in Food Analytical Chemistry, (2001), A1.1.1-A1.1.6.
Salvador, A, et al., "Effect of the addition of different ingredients on the characteristics of a batter coating for fried seafood prepared without a pre-frying step", Food Hydrocolloids, vol. 19, No. 4, (Jun. 2005), 703-708.
Shahidi, Fereidoon, "D1.1.4 Extraction and Measurement of Total Lipids", Current Protocols in food-analytical Chemistry, John Wiley & Sons, (May 1, 2003), 2 pgs.
Shahidi, Fereidoon, "Unit D1.1 Extraction and Measurement of Total Lipids", Current Protocols in Food Analytical Chemistry, John Wiley & Sons, (May 1, 2003), 11 pgs.
Shih, F, et al., "Oil Uptake Properties of Fried Batters from Rice Flour", J. Agric. Food Chern., vol. 47, (1999), 1611-1615.
Shih, F., et al., "Preparation and Characterization of Low Oil Uptake Rice Cake Donuts", Cereal Chemistry, 79(5), (Sep. 2002), 745-748.
Zhe, W., et al., "Research On new low fat fried sweet potato chips", Food Science and Technology of Shandong, No. 4, (Apr. 30, 2001), 9-10.
"U.S. Appl. No. 14/444,731, Appeal Brief filed Nov. 6, 2015", 11 pgs.
"U.S. Appl. No. 14/613,577, Final Office Action mailed Oct. 23, 2015", 12 pgs.
"Canadian Application Serial No. 2,624,725, Response filed Oct. 13, 2015 to Office Action mailed Apr. 10, 2015", 8 pgs.
"Chinese Application Serial No. 201210343055.3, Response filed Mar. 9, 2015 to Office Action mailed Dec. 24, 2014", w/ English Claims, 11 pgs.
"Chinese Application Serial No. 201210343055.3, Response filed Sep. 14, 2015 to Office Action mailed Jun. 24, 2015", w/ English Claims, 8 pgs.
"European Application Serial No. 06816324.5, Communication Pursuant to Article 94(3) mailed Oct. 16, 2015", 7 pgs.
"European Application Serial No. 15152470.9, Extended European Search Report mailed Oct. 5, 2015", 6 pgs.
"U.S. Appl. No. 14/613,577, Response filed Feb. 23, 2016 to Final Office Action mailed Oct. 23, 2015", 17 pgs.
"DynaShear™", ADMIX Advanced Mixing Technologies, 6 pgs; Jun. 2001.
"Israel Application Serial No. 190606, Office Action mailed Feb. 15, 2016", 6 pgs.
"U.S. Appl. No. 14/444,731, Examiner's Answer mailed May 3, 2016", 16 pgs.
"European Application Serial No. 06816321.1, Office Action mailed Sep. 29, 2014", 3 pgs.
"European Application Serial No. 06816321.1, Response filed Nov. 28, 2014 to Office Action mailed Sep. 29, 2014", 50 pgs.
"European Application Serial No. 06816324.5, Communication Pursuant to Article 94(3) mailed Mar. 4, 2016", 6 pgs.

(56) References Cited

OTHER PUBLICATIONS

"European Application Serial No. 06816324.5, Response filed Feb. 3, 2016 to Communication Pursuant to Article 94(3) mailed Oct. 16, 2015", 14 pgs.

"Indian Application Serial No. 3143?DELNP/2008, Response filed Jan. 6, 2015", 18 pgs.

"Israel Application Serial No. 190606, Office Action mailed Feb. 16, 2016", 2 pgs.

"Israeli Application Serial No. 190606, Voluntary Amendment filed Feb. 15, 2016", with English translation of claims, 6 pgs.

"Japanese Application Serial No. 2013-218466, Response filed Apr. 13, 2015", with English translation of claims, 12 pgs.

"Japanese Application Serial No. 2013-218466, Response filed Oct. 19, 2015", with English translation of claims, 12 pgs.

"Mexican Application Serial No. MX/a/2008/004595, Voluntary Amendment filed Aug. 6, 2015", 10 pgs.

"Australian Application Serial No. 2015261665, Response filed Oct. 19, 2016 to First Examiner Report mailed Jul. 6, 2016", 23 pgs.

"Australian Application Serial No. 2015261665, Subsequent Examiners Report mailed Nov. 10, 2016", 3 pgs.

"International Application Serial No. PCT/US2016/045415, Written Opinion mailed Oct. 10, 2016", 5 pgs.

\* cited by examiner

PROCESS FOR THE CONTROLLED INTRODUCTION OF OIL INTO FOOD PRODUCTS

This application is a continuation-in-part of U.S. patent application Ser. No. 14/444,731, filed Jul. 28, 2014, which is a divisional application of Ser. No. 14/055,994, filed Oct. 17, 2013; now U.S. Pat. No. 8,980,393; which is a continuation of Ser. No. 14/054,323, filed Oct. 15, 2013, now U.S. Pat. No. 8,962,094; which is a continuation of Ser. No. 12/090,845, filed Jul. 6, 2009, now U.S. Pat. No. 8,715,760; which is a 371 application of PCT/US2006/038963, filed Oct. 4, 2005, which claims priority to U.S. Provisional Patent No. 60/723,880, filed Oct. 4, 2005, and to U.S. Provisional Application No. 60/820,743, filed Jul. 28, 2006; and the present application is a continuation-in-part of U.S. patent application Ser. No. 14/613,577, filed Apr. 2, 2015, which is a continuation application of Ser. No. 12/090,842, now U.S. Pat. No. 8,980,350; which is a 371 application of PCT/US2006/038966, filed Oct. 4, 2006, which claims priority to U.S. provisional patent application No. 60/723,881, filed Oct. 4, 2005 each of which is incorporated herein by reference in its entirety.

BACKGROUND OF THE INVENTION

The present invention relates generally to methods of making low-fat, fat free, or full-fat food products, and products made according to the method, in which food pieces are subjected to a controlled application step of oil and can be subjected to enzyme and/or cation treatment, blanching and/or specific cooking and/or drying techniques, to provide for snack food products having the texture, flavor, and other characteristics of conventional full-fat fried products.

Snack food products typically are made by frying sliced vegetable pieces in hot oil so that the moisture content of the sliced food pieces is reduced to a very low level and fat content is raised exponentially. Such products generally have a characteristic crispness that adds significantly to its organoleptic desirability. Fried potato or apple chips prepared using conventional methods generally have a fat content from about 30 percent to about 40 percent by weight, a percentage of fat that is considered by some to be unhealthy if these types of products are broadly substituted for low-fat foods and consumption is significant over time. While such products are accepted in the marketplace, consumers' desire to lower their fat consumption, limits this acceptance.

Furthermore, the conventional methods generally used, require these foods to be fried at high temperatures that can result in the production of potentially deleterious by-products. Reports of such by-products in recent years have led to general concerns about both fried and baked foods, especially those containing high amounts of fats and carbohydrates. Reports of acrylamide formation, generally in proportion to the degree of browning of foods high in fats and carbohydrates, have raised significant concerns within the food industry, the potential for harmful effects of this particular processing by-product.

To address some of these concerns, efforts have been made to reduce the amount of fat in such snack food products, and more recently, to find ways to minimize formation of potentially deleterious substances such as acrylamide and the like.

In recent years, "light" chips have been made using synthetic oils/fat that is substantially non-digestible and consequently non-absorbable by the human body, e.g. OLESTRA™. These products have received limited acceptance due in part to off-flavors perceived by some reports of detrimental gastrointestinal side effects and an FDA requirement of a warning label on such products, providing information that such fat substitutes may cause gastrointestinal side effects such as loose stools and abdominal cramping and/or the inhibition of absorption of some nutrients.

While products such as potato and apple chips are typically made using conventional frying methods, snack food products made with other nutritionally beneficial vegetables and fruits such as carrots, squash, parsnips, yuccas, pears, and the like have not successfully entered the market substantially due to the lack of effective processing methods.

There have been numerous efforts in the past to reduce the amount of fat in snack foods such as potato chips, via various processing means. These methods have achieved limited success in reducing fat content while still achieving desirable taste. One example is by conditioning surfaces of the food pieces prior to frying in oil in order to reduce oil absorption during frying.

Another example of reducing fat content is preparing the food pieces with full-fat or near full-fat content through conventional frying methods, and to subsequently remove some of the oil, such as via centrifugal force or superheated steam. These methods tended to be complicated and expensive, are known to damage or otherwise undesirably alter the final product, and would typically remove only a small fraction of the oil, and less than the amount of oil removal desired.

Yet another method of reducing oil content involved alternative methods of drying the food pieces without frying in oil, such as microwave heating, convection ovens, fluidized bed dryers, and the like. Oil or fat was typically applied in a separate step, such as a spraying step, in order to achieve a desired flavor while providing for some control over the amount of fat applied to the food pieces. However, ideally the food pieces should be in a monolayer to ensure even application of the oil, which can be difficult and expensive. Alternatively, the oil can be applied in a spray drum, which can evenly distribute the oil, but generally must be applied after drying, which can result in less desirable taste and texture than when the oil is applied before drying.

Because of the difficulties in spraying the oil, oil can also be applied by immersing the food pieces in the oil without cooking the food pieces. It is considerably more difficult to control the oil uptake onto or into the food pieces through oil immersion. For example, the parameters that tend to affect oil uptake the most are immersion time and temperature. Low-temperature oil has a higher viscosity, and thus tends to more easily adhere to the food pieces, while higher-temperature oil is less viscous, and less likely to adhere, but will also tend to be more likely to penetrate the surface of the food pieces, resulting in higher oil uptake. A food piece that has been fully immersed in oil of any temperature for any length of time will emerge with a minimum carry-over of oil that adheres to the surface of the food piece. For example, for potato slices the carry-over can be 5-12% of the weight of the slice, depending on slice thickness. After subsequent drying the percentage of oil by weight can be comparable to, or only modestly below, the oil take-up via traditional frying methods. Excess take-up of oil via the immersion method can be partially controlled by a subsequent oil removal step, such as gravitational draining, water sprays, or pressurized air jets. These methods, however, can also be difficult because of the need to monolayer the food pieces to ensure even removal of oil. The oil removal also adds another step to the process.

Roan (U.S. Pat. No. 4,058,631) discloses a method of making fried food in which raw food product is treated with an aqueous solution of an enzyme, such as alpha amylase, for a period of time sufficient for the enzyme to penetrate and coat the surface of the food, and thereafter the food product is deep fried. Roan indicates that when the surface of a raw, starchy food product is coated with an aqueous solution of alpha amylase prior to frying, less fat is absorbed in the food during frying than occurs without the enzyme treatment, and the flavor of the fried food is improved.

Dreher et al. (U.S. Pat. No. 4,756,916) discloses a process for producing low oil potato chips comprising washing potato slices with an aqueous solution, and applying oil to the washed slices to coat the slices with oil. The oil-coated slices are arranged as a monolayer on an endless conveyor belt, blanched at a temperature between about 160° F. and 212° F., and then baked at a high temperature of at least about 390° F. but below the smoke point of the oil, to partially dry the slices by reducing the aqueous moisture content of the slices to about 10-20% by weight. The partially dried slices then are further baked at a lower temperature of about 290°-320° F. to finish drying the slices by reducing the aqueous moisture content of the slices to about 2% by weight or less, to produce a product having an oil content of between about 10-25% by weight.

Laufer (U.S. Pat. No. 5,292,540) discloses a process for preparing potato chips comprising the steps of washing potatoes to remove foreign matter from the skin thereof, cutting the potato into thin slices, baking the slices for a period of about six to twelve minutes within a temperature range of about 250 to 500° F., and heating the slices in a microwave oven for about two to seven minutes.

Yamashita (U.S. Pat. No. 5,312,631) discloses a method for preventing cut pieces of agricultural products from sticking to each other during the steps of drying and cooking, which includes washing the cut pieces with, or immersing the same in, a solution of an amylolytic enzyme, or an acidic or alkaline aqueous solution. The cut pieces are blanched prior to enzyme treatment.

Zussman (U.S. Pat. No. 5,370,898) discloses a cooking process for food chip products that does not involve oil-based cooking. Food slices are washed with water to remove extractable surface starch, multi-layered, transported to an oven, and baked in a fluidized bed of hot air or steam. The baking process is a multi-step process, whereby the food slices are exposed to a higher pressure in a first zone for several minutes to ensure that the individual food pieces are separated. The pressure is then lowered in a second zone for a second period of time. Similarly, in a third zone the pressure is reduced for a predetermined period of time to finish cooking the food products. Thereafter the chips are air-dried or finished in a dryer.

Lewis et al. (U.S. Pat. No. 5,441,758) discloses the preparation of low-fat or fat free potato chips or straws by a process comprising slicing potatoes to form slices or straws, blanching the sliced potato, and treating the slices during or after blanching with a high temperature amylase enzyme to prevent later sticking together of slices during processing. The slices are thereafter dehydrated at 158° F.-212° F. content of 9% or lower. The dehydrated potato pieces are then rehydrated to a moisture content of 12% to 30%, and thereafter toasted to about 2% moisture at a temperature of 140° C. to 220° C. The use of a high temperature amylase is required so that the enzyme remains effective during processing, and is not inactivated by the blanching step. Lewis et al. discloses that a small amount of oil may be added at any point in the process, "but preferably just after toasting."

Petelle et al. (U.S. Pat. No. 5,470,600) discloses a method of making fat-free potato chips, by initially cooking potato slices in a three zone primary oven, by first radiant heating the slices and then subjecting the slices to two successive stages of forced air heating to reduce the moisture content of the slices to near a final moisture content. Petelle et al. further discloses independently controlling the time duration in each of the three zones, simultaneously forcing the air into the top and bottom surfaces of the slices in the primary oven to a near final moisture content of about 15% by weight, independently controlling the time duration of the slices in the dielectric heater to a final moisture content of about 7% by weight using wavelengths of about 65.8 feet at a frequency of about 15 mhz, and allowing the slices to successively, increasingly pile up in the last two forced air stages and the dielectric heating stage.

Benson et al. (U.S. Pat. No. 5,603,973) discloses a process for making potato chips without the use of oil, wherein whole potatoes are cut into discrete slice pieces which are washed to remove starch or debris from the slice surfaces. The slices are arranged in a single layer and the surface water is removed from the slice surfaces by exposing them to blasts of air and suction. Alternatively, the slices may be washed in warm water at a temperature of about 130° F. to preheat them. The slices are transferred to a heated conveyor to enter an infrared zone for exposure to high intensity infrared energy for a short period of time, less than 25 seconds, effecting a blanching of the slices and quenching of naturally-occurring deleterious enzyme action. In a subsequent step, dry air is impinged upon the slices from above and below to reduce the water content below 35% by weight. The slices are accumulated in a multi-layer pack and dried in moving air until moisture content has been obtained to a level on the order of 0.5% to 2%.

Wiedersatz (U.S. Pat. No. 5,858,431) discloses a method for preparing fat-free snack chips, comprising preparing slices of raw food product, which are subjected to a high intensity air knife arrangement to remove surface moisture, then exposed to a hot air fluid bed impingement including multiple dual-zone hot air fluid bed impingement ovens operating under different predetermined conditions. In the preferred embodiment, the slices are exposed to two dual-zone hot air fluid bed impingement ovens, the first oven having a conveyor belt transporting slices through the oven at a speed of 2.5 to 3.0 feet per minute and operating at 500 to 525° F. (zone 1) and 450 to 500° F. (zone 2), and the second oven having a conveyor belt operating at a speed of 1.5 to 2.0 feet per second and at 350 to 400° F. (zone 1) and 300 to 350° F. (zone 2). The first impingement oven of the preferred embodiment removes approximately 50 to 60 per cent of the moisture in each slice, while the second impingement oven of the preferred embodiment removes approximately 20 to 30 per cent of the remaining moisture. The slices may then have oil and/or seasoning applied thereto, and are passed to a combination microwave and hot air dryer which removes entrained moisture without scorching the chips.

Xu et al. (U.S. Patent Publication No. 2002/0004085) discloses methods for producing a consumable product from potatoes, comprising: (a) treating a potato substance with an effective amount of one or more exogenous enzymes selected from the group consisting of an amyloglucosidase, glucose oxidase, laccase, lipase, maltogenic amylase, pectinase, pentosanase, protease, and transglutaminase, and (b) processing the enzyme-treated potato substance to produce a potato product. In one embodiment, blanching of the potato substance may occur prior to enzyme treatment. The processing step may include partial dehydration to reduce the initial moisture content by about 5-30% prior to frying in oil or baking.

Despite the many advances in the processing of snacks and chips, there nevertheless remains a need for improvements to these products, and the processes for making them, characterized by improved crispness, mouth feel and flavor properties, reduction of fat content and overall improvement in nutritional profile, including minimization of exposure to conditions that can result in the formation of potentially deleterious by-products. These all require processes that are feasible, efficient, manageable, and are practically and economically scalable for production at output levels necessary for product commercialization in an adequately fuel efficient production environment.

SUMMARY OF THE INVENTION

A first embodiment of the present invention is directed to a method of making a food product comprising, (a) providing a plurality of cut or shaped food pieces;

(b) exposing the food pieces to a solution comprising an effective amount of one or more starch-reducing enzymes to coat the surface thereof;

(c) thereafter blanching the plurality of food pieces for a time sufficient to inactivate any enzymes on the surface of the food pieces, wherein the food pieces have an initial moisture level after the blanching step; and (d) reducing the initial moisture level to a final moisture level of about 0.5 to about 20% by weight, wherein the food pieces are not subjected to cooking by immersion in hot oil ("deep fat frying").

A second embodiment of the present invention is directed to a method of making a food product comprising, (a) providing a plurality of cut or shaped food pieces;

(b) exposing the food pieces to a solution comprising one or more cations to coat the surface thereof;

(c) thereafter blanching the plurality of food pieces for a time sufficient to inactivate any enzymes on the surface of the food pieces, wherein the food pieces have an initial moisture level after the blanching step; and (d) reducing the initial moisture level to a final moisture level of about 0.5 to about 20% by weight, wherein step (d) does not comprise frying the food pieces in hot oil.

A third embodiment of the present invention is directed to a method of making a food product comprising, (a) providing a plurality of cut or shaped food pieces;

(b) blanching the plurality of food pieces for a time sufficient to inactivate any enzymes on the surface of the food pieces, wherein the food pieces have an initial moisture level after the blanching step; and (c) reducing the initial moisture level to a final moisture level of about 0.5 to about 20% by weight by exposing the food pieces to a first moisture level reduction procedure which reduces the initial moisture level to an intermediate moisture level of about 10 to about 80% by weight, and thereafter exposing the food pieces to a second moisture level reduction procedure which reduces the intermediate moisture level to the final moisture level, wherein step (c) does not comprise cooking the food pieces in hot oil.

A fourth embodiment of the present invention is directed to a snack food product comprising cut or shaped food pieces, wherein each of the food pieces has a predetermined fat content of less than about 1 to about 35% by weight, an average force of fracture of less than or equal to 12 N, and an average Young's modulus of equal to or greater than about 3.5 N/mm.

A fifth embodiment of the present invention is directed to a method of making a food product comprising, (a) providing a plurality of cut or shaped food pieces;

(b) blanching the plurality of food pieces, wherein the food pieces have an initial moisture level after the blanching step; and (c) reducing the initial moisture level to a final moisture level of about 0.5 to about 20% by weight by drying the food pieces in one step or multiple steps wherein at least one step is conducted in a rotary dryer, a fluidized bed dryer, a vibrating fluidized bed dryer and the like or combinations thereof while controlling the temperature, air flow and movement of the food pieces to allow for even and constant exposure of the food pieces to heat, wherein step (d) does not comprise frying the food pieces in hot oil.

A sixth embodiment of the present invention is directed to a method of making a food product comprising, (a) providing a plurality of cut or shaped food pieces;

(b) blanching the plurality of food pieces, wherein the food pieces have an initial moisture level after the blanching step; and (c) reducing the initial moisture level to an intermediate moisture level of about 10 to about 80% by weight while controlling the temperature, air flow and movement of the food pieces to allow for even and constant exposure of the food pieces to heat, and thereafter exposing the food pieces to a second moisture level reduction procedure which reduces the intermediate moisture level to the final moisture level, e.g., of less than 5-10 wt-% moisture. Wherein step (c) does not comprise cooking the food pieces in hot oil.

A seventh embodiment of the present invention is directed to a method of making a food product comprising, (a) providing a plurality of cut or shaped food pieces;

(b) thereafter blanching the plurality of food pieces for a time sufficient to inactivate any enzymes on the surface of the food pieces, wherein the food pieces have an initial moisture level after the blanching step; and (c) reducing the initial moisture level to a final moisture level of about 0.5 to about 20% by weight in accordance with any of the aforementioned embodiments herein, either (i) without the application of a solution comprising enzymes and/or cations or (ii) by exposing the food pieces to a solution comprising at least a combination of one or more enzymes and/or one or more cations in any feasible manner, preferably in one or more aqueous solutions of the enzymes and/or the cations, that are applied before the blanching step (b) in the embodiments below to coat the surface thereof, and wherein reducing the initial moisture level in step (c) does not comprise cooking the food pieces in hot oil.

An eighth embodiment of the present invention provides food products such as snack food products made from vegetables, fruits, nuts, grains and other consumable ingredients, and any combination thereof, and the method of their production, where the commercial production of such snack foods, or the production of their healthier versions, were not previously feasible, or that required that the food pieces be fried in hot oil or fat.

A ninth embodiment of the present invention comprises the application to food pieces of a mixture of water and oil, such as a homogenous mixture of oil and water, that for convenience, will be referred to herein as a water and oil "emulsion," although it is not necessary to employ exogenous emulsifiers or surfactants to provide the beneficial effects of the emulsion. The process can provide for the precise control of the application of oil to food pieces prior to the removal of moisture from the food pieces, for example by drying or cooking the food pieces, such as via hot air, thermal or microwave ovens, and/or dryer(s), without frying the food pieces in hot oil.

Although oil-spraying methods can be used in the present method, e.g., to apply oil to the dried or cooked food product, the present process for oil application can avoid the disadvantages associated with oil spraying methods in that the present method can apply a uniform coating of oil on the surface of the food pieces. The process can further offer an advantage over the addition of oil by immersion of the food pieces in 100% oil in that the process can permit a wide and precisely controllable range of oil content to be achieved in the finished food product, anywhere from trace or low amounts of oil (about 0.2-10 wt-%) to amounts approaching those of food pieces fried in oil, while avoiding application of oil in the cooking/drying step(s).

The present disclosure also describes food products, such as snack food products, having the texture, flavor, and other characteristics of conventional full-fat products, but with reduced and/or controlled amounts of oil as compared to products cooked in hot oil. Acrylamides can also be low in the present food products, e.g., potato chips and other snack food products can be prepared that have less than 150 ppb acrylamide.

In accordance with a further embodiment, a process for making a food product can include:

(a) providing a plurality of cut or shaped food pieces;

(b) applying an oil-water emulsion to the food pieces for a time sufficient to provide a predetermined amount of oil to the food pieces and so that the food pieces have an initial moisture level after applying the oil-water emulsion; and (c) reducing the initial moisture level to a moisture level of from about 0.2 to about 80% by weight, including 10-80% wt-%, such as 35-70 wt-%, e.g., 40-65.

In accordance with additional embodiments, the final moisture level can be from about 0.5 to about 5.0% by weight. Oil can be present from trace amounts, to up to about 1-3 wt-%, up to about 10 wt-%, up to about 15 wt-%, or up to as high as about 30-35 wt-% oil, but in the absence of "deep fat" frying/cooking the food pieces in oil.

In accordance with a further embodiment of the invention, a method is provided for making a food product, comprising, (a) providing a plurality of cut or shaped food pieces;

(b) optionally exposing the food pieces to a solution comprising one or more enzymes and/or one or more cations to coat the surface thereof;

(c) thereafter, optionally blanching the plurality of food pieces for a time sufficient to inactivate any enzymes on the surface of the food pieces, wherein the food pieces have an initial moisture level after the blanching step;

(d) contacting the food pieces with an oil/water emulsion to impart an initial preselected oil content to said food pieces; and (e) reducing the initial moisture level to a moisture level of from about 0.2 to about 20% by weight. In accordance with additional embodiments, the moisture level is preferably from about 0.5 to about 10% by weight.

A moisture level of about 10 to about 80% by weight, preferably about 20 to about 50% by weight, more preferably about 25 to about 35% by weight, may be achieved with a number of the embodiments of the present invention, after the first moisture level reduction step. Thereafter, the food pieces are optionally exposed to a second moisture level reduction procedure which reduces the intermediate moisture level to the final moisture level. The intermediate and the final drying steps may further be broken down to sub steps, or alternatively combined into one step.

As used herein, the term "providing" the cut or shaped food pieces includes the processor's or user's receiving pre-cut or shaped food pieces or obtaining whole fruits and/or vegetables and then cutting, slicing or otherwise forming them into the shape of the final food product, such as a chip, strip, fry, etc.

Additional features of the invention can be understood in reference to the accompanying descriptive matter in which there is illustrated and described preferred embodiments of the present invention.

DESCRIPTION OF THE PREFERRED EMBODIMENTS

The processes described herein can provide for the preparation of food products, such as snack food products, comprising a predetermined fat content. The process can provide for precise control of the fat content of the food pieces. The process can include coating the food pieces with a homogenous or substantially homogenous mixture of water and oil, followed by drying the food pieces to yield a food product having the desired oil and moisture content. More particularly, the process can comprise applying an oil-water emulsion mixture to food pieces, such as fruit or vegetable chips or sticks, which have traditionally been fried in oil, but which can now be cooked or dried through other means in the absence of frying, flash frying, deep fat frying or par-frying, in order to produce a final food product possessing similar organoleptic properties to a corresponding food product fried in oil, but preferably having a reduced fat content.

In examples, the oil used in the oil-water emulsion can be a natural or synthetic edible oil. The term "edible" can refer to fats and oils that can be ingested by humans and animals without significant toxicity, whether or not they are nutritious. This term includes both natural and synthetic oils. The term "fat" includes lipids that are solid at room temperature (20-25° C.) but are liquid at the temperatures conventionally used to cook food pieces by frying.

A process is described herein, the process comprising:

(a) providing a plurality of cut or shaped food pieces;

(b) applying an oil-water emulsion to the food pieces for a time sufficient to provide a predetermined amount of oil to the food pieces and so that the food pieces have an initial moisture level after applying the oil-water emulsion; and (c) reducing the initial moisture level to a final moisture level of from about 0.2 wt-% to about 80 wt-% to provide a food product, in the absence of frying in oil.

A food product is also described herein, the food product comprising a plurality of cut or shaped food pieces and a coating on the plurality of food pieces, the coating comprising an oil-water emulsion wherein the oil content of the oil-water emulsion that contacts the food pieces is from about 5 wt-% and about 85 wt-% of the coating. In some examples, the food pieces and the coating are dried to a moisture content of from about 0.2 wt-% to about 20 wt-%.

Preferably the food pieces are treated with water comprising cations and/or effective amounts of one or more surface starch—removing or—degrading enzymes prior to blanching and application of the oil—water emulsion. The cations can also or alternatively be included in the blanching medium, e.g., the blanch water.

In preferred embodiments, the present invention provides a snack food product processed in such a manner so as to provide a plurality of cut or shaped food pieces that have a taste, texture and/or appearance of conventionally produced products made by a process including a step in which the food pieces are fried in oil (typically at temperatures of greater than about 300° F.-400° F.) so to yield a finished food product that contains, e.g., about 25-40 wt-% oil. Preferably, a snack food product prepared in accordance with the present invention, in the absence of frying in oil, has at least one, preferably at least three, preferably at least five, of the following attributes: a crisp texture, a fat content of less than about 35 wt-% fat, such as about 15 wt-% fat or less, for example about 10 wt-% fat or less, such as about 1 wt-% fat or less, for example about 0.5 wt-% fat or less; a moisture content of greater than about 0.1 wt-% water, such as from about 0.5 wt-% to about 80 wt-%, water, or from about 0.5 wt-% to about 10 wt-% water; the food products in the form of a chip, a stick, or a slice; the food pieces fracturing at less than or equal to about 12 N; and the food pieces having an average Young's modulus of equal to or greater than about 3.5 N/mm. The food products can contain about 0.5 wt-% fat or less, up to about 45 wt-% fat, or can comprise up to about 5-20 wt-% fat, or as much as about 30-35 wt-% fat, e.g., about 1-15 wt-% fat. Certain of the food pieces, such as chip-type snack food products will fracture at less than or equal to about 12 N and have an average Young's modulus of equal to or greater than about 3.5 N/mm.

In yet another preferred embodiment the present invention provides a food product and the method of its production and/or cooking processed in such a manner so as to provide a plurality of cut or shaped food pieces that (i) have a new and/or unique taste, texture and/or appearance, or (ii) have less fat and/or are considered as healthier versions of currently available products, or (iii) have been made from vegetables, fruits, grains, nuts, legumes or any other consumable ingredients and their combination thereof where the production of such products were not previously feasible due to lack proper production and/or cooking methods.

Surprisingly, the present invention has been found to retain the desired high quality, flavor, texture, appearance and consumer acceptability of high-fat snacks, through certain desirable treatment of the raw materials and subsequent cooking under conditions that eliminate, optionally minimize, and/or control the amount of contact with fats, such as oils or oil substitutes, and limit the potential for producing potentially deleterious by-products such as acrylamides or carcinogenic aldehydes.

Further, in contrast with known conventional frying methods, the food pieces can be infused with a predetermined amount of fat in a totally controlled environment during the production process. In addition to being able to control the desired amount of fat being applied to the products of present invention to an exact amount, the present invention entirely eliminates the need for utilizing pools of hot oils or oil substitutes, and maintaining, filtering out, and, at last, in most cases, disposing of the related fats used in the production process.

In addition, the present invention also eliminates the need for using defatters or other oil-removal means, such as described in the patents cited hereinabove in the production of relevant low-fat snack food products.

Food Pieces

The term "food pieces" is intended to include subunits or pieces derived from substantially any foods. Preferably, the food pieces may be provided as cut or shaped food pieces that can be shaped or reshaped directly from their raw state. These foods include meat, poultry, fish, shellfish, vegetables and/or fruits, including potato, beet, pumpkin, squash, tomato, mushroom, zucchini, carrot, eggplant, apple, pear, bananas, berries, grains, beans, nuts, seeds, rutabaga, plantain, taro, okra, onion, parsnip, yam, sweet potato, yucca, papaya, mango, pineapple, and the like. These food pieces include pureed, sliced, diced, milled, grinded, powdered, or pulverized fruits, vegetables, legumes, grains, nuts, beans, seeds and the like, including products such as beans, rice, corn, wheat and the like.

Singly or in combinations, the aforementioned products and ingredients, preferably beans, rice, corn, corn masa, wheat and the like can be manipulated to form sheets, slices or pieces of food composition through extrusion or sheeting of a prepared dough or mixture and the like. The dough or mixture thus formed then can be extruded or cut into any desired shapes. There are many variations on this basic procedure for manipulating flour or dough into a shape suitable for the present process. For example, see U.S. Pat. No. 3,600,193 (mixing corn flour with seasonings); U.S. Pat. No. 3,922,370 (mixing water, rice and rice flour); and U.S. Pat. No. 3,348,950 (mixing corn, sucrose, water, and corn grits), each of which is hereby incorporated by reference. Generally, the process of the invention can be used with all foods that were heretofore fried or with foods that cannot tolerate the frying process. The format of the food can include, for example, sticks, strips, slices, chips, crinkle cut, waffles, popcorn texture, flakes, and the like. Flaked products may be made into bars or cereals themselves or used as ingredients for granola, granola bars, or add-ins to yogurt, cereals, trail mixes, snack mixes, and the like.

For example, corn tortilla products, such as tortilla chips or bean chips can be prepared initially by forming a composition from water and corn, corn masa, or bean flour, or alternatively cooked corn or beans, and cooked in conventional ovens such as tortilla ovens. Tortilla or bean strips or rounds can then be treated and processed using the current invention to produce fat free or low fat snack products that have a crispy texture and flavor of fried foods without frying in oil or oil substitutes. Generally, the process of the present invention can be used with all snack foods that have traditionally been fried in oil to achieve a crisp texture and traditional fried flavor.

In another embodiment, the sheeted or extruded dough or mixture described herein can be made from a potato mixture or other starch material, alone or in combination with other ingredients, and then processed in accordance with the teachings of the present invention to a crispy finished product without frying.

Preferred food pieces are derived from fruits and/or vegetables that have a generally solid inner matrix that is exposed when sliced and demonstrates fracturability when a slice is bent. In a preferred embodiment, the food pieces are derived from potatoes such as those generally used to produce potato chips. In preferred embodiments, the food pieces comprise a potato substrate. The potato substrate may simply be farm-grown potatoes (e.g. raw potatoes) of any variety. Such varieties include, but are not limited to, Bintje, Russet Burbank, Yukon Gold, Kennebec, Norchip, Atlantic, Shepody, Sebago, Red Pontiac, Red Warba, Irish Cobbler "BC", Norgold Russet "BC", Norland, Atlantic, White Rose, Superior, Centennial Russet, Keswick "NB 1", Green Mountain, La Soda, Red La Rouge, Red Nordland, Red Bliss, Yellow Finnish, Ruby Crescent, and Australian Crescent, Russian Blue, Peruvian Blue, Superior, Katandin, and sweet potato varieties such as Beauregard, Jewel, Nemagold, Centennial, Excel, Regal, Southern Delite (Hernandez, Vardaman, Travis, White Delight, Sumor, Nancy Hall, Picadita, Campeon, Star Leaf/Boniato, Japanese, Chinese, and Okinawan Purple and the like.

Further processing to the food pieces can be performed as well. For example, for vegetable food pieces, such as potatoes to make potato chips or French fries, the process can include exposing the food pieces to a solution comprising one or more enzymes, one or more cations, or both. The food pieces can also be blanched, such as by immersing the food pieces in water having a temperature of from about 60° C. to about 100° C., which can deactivate the enzymes. This additional processing can be performed before applying the oil-water emulsion to the food pieces.

In alternative embodiments, other nutrients including vitamins and minerals, such as Vitamin A, Vitamin, B6, Vitamin B12, Vitamin C, Vitamin D, Thiamin, Riboflavin, Niacin, Folic Acid, Phosphorous, Magnesium, Copper, Calcium, Zinc, Iron and the like can be added to the products of present invention either by infusing such vitamins and minerals into the food pieces in the enzyme treatment, cation treatment, oil application and/or blanching process, or in an additional step or by spraying a compound including any desired vitamins and/or minerals over the food pieces prior to or after cooking. This procedure results in a product that is nutritionally fortified and can make snack food products that are healthier.

In alternate embodiments, flavor enhancers and seasoning blends such as salt (NaCl), sugar, herb extracts, fruit extracts, vegetable extracts and the like or a combination thereof can be infused into the snack food product by steeping or soaking the cut food pieces with the respective salt, sugar, herbs, fruits, vegetables and the like, thereby incorporating these flavoring components into the food pieces either in the blanch water and/or by having a separate step following or prior to the blanching step in which flavors are fused into the cut food pieces. Alternately, cut food pieces may be soaked in concentrated flavor extracts that are either aqueous or otherwise. In yet another embodiment, the snack food products of the present invention may be coated with chocolate, caramel, syrups, and coatings made from fruits or vegetables or any other similar covering, thereby creating other novel gourmet snacks that are free of, or alternatively low or high in fat.

Food Piece Preparation. The food pieces are cut, formed or shaped from one or a combination of food materials. For raw vegetables or raw plant materials, the food pieces are preferably cleaned, optionally peeled, and cut. Preferred vegetables such as potatoes, vegetables, fruit, or other food products are preferably cut into slices, sticks or strips of a desirable size and shape for chips, sticks, shoestrings, wavy cut chips, crinkle cut chips, waffle cut chips, straight cut chips and sticks and the like. After cutting, forming or shaping, the prepared food pieces are preferably contacted with an aqueous medium, such as a water rinse, to remove free starch. Removing the free starch is best for optimizing use and reducing the amount of enzyme, plus free starch can leave a powdery appearance after drying the chip.

Enzyme and/or Cation Treatment: The prepared food pieces may be exposed to an enzyme solution or a cation solution, more preferably an enzyme and cation solution. When enzyme treatment is performed, the enzymes are preferably used in amounts that contribute to one or more of the improved properties as defined herein and/or provide at least one of the following advantages: increasing the crispness, reducing the stickiness and improving color of finished products. Without being bound by theory, it is believed that the optional cations increase the activity of the enzymes, reducing time in the solution, and also make the cut food pieces more firm or rigid so they are easier to process. Further, cations may also decrease enzymatic browning as well as contribute to the snack food product's nutritional profile.

The appropriate exposure to a given enzyme or cation for improving a specific property or properties of a snack food product will depend on the enzyme or cation in question. The skilled person may determine a suitable enzyme or cation exposure on the basis of methods known in the art. Where both enzyme and cation treatments are performed, the treatments are preferably carried out simultaneously using a single solution, although the treatments may also be performed separately using an enzyme solution followed by a cation solution, or a cation solution followed by an enzyme solution. Salts and/or flavoring ingredients can also be added to any of the solutions.

The enzymes to be used in the methods of the present invention may be in any form suitable for the use in question, e.g., in the form of a dry powder, agglomerated powder, or granulate, in particular a non-dusting granulate, a liquid, in particular a stabilized liquid, or a protected enzyme. Granulates and agglomerated powders may be prepared by conventional methods, e.g., by spraying the enzyme(s) onto a carrier in a fluid-bed granulator. The carrier may consist of particulate cores having a suitable particle size. The carrier may be soluble or insoluble, e.g., a salt (such as NaCl or sodium sulfate), a sugar (such as sucrose or lactose), a sugar alcohol (such as sorbitol), starch, rice, corn grits, or soy. The enzymes may be contained in slow-release formulations. Methods for preparing slow-release formulations are well known in the art. Liquid enzyme preparations may, for instance, be stabilized by adding nutritionally acceptable stabilizers such as a sugar, a sugar alcohol or another polyol, and/or lactic acid or another organic acid according to established methods.

Suitable enzymes, forms taken by the enzymes, commercial availability, etc. for use in accordance with the present invention are chosen from one or more of the enzymes listed in U.S. Pat. Nos. 4,058,631; 5,312,631; and 7,056,544, each of which is incorporated by reference herein. Preferably, the enzyme is other than a high-temperature enzyme, such as the high temperature amylase described in U.S. Pat. No. 5,441, 758. However, under certain circumstances, such an enzyme may be used in accordance with the invention, and the use of a high temperature enzyme is not disclaimed herein. Preferred enzymes in accordance with the present invention include amylase (alpha and/or beta), cellulase, invertase, pectinase and amyloglucosidase, with amylase being the most preferred. Preferred enzymes are those than can degrade the starches present on the surfaces of the food pieces, e.g., by cleaving various saccharides from the starches. Such degradation may occur to starches present in the interior of the food pieces. Preferably, the one or more enzymes is present in the solution at a concentration of about 0.1 to about 5% by weight.

In accordance with the invention, the enzyme solution may further comprise one or more cations, or the cations can be provided in a solution without enzymes. The term "cation-producing compound" is intended to include compounds in which cations are produced in solution via dissociation of the cation with an anion, either at ambient temperatures or with the addition of heat. Suitable cation-producing compounds in accordance with the present invention include, but are not limited to, alkali metal salts, such as lithium, sodium and/or potassium salts; alkaline earth metal salts, such as magnesium and/or calcium salts; aluminum compounds; and group VA metal compounds, such as nitrogen, phosphorous and/or bismuth compounds (e.g., ammonium). More preferred from this set of compounds are calcium salts, magnesium salts, potassium salts, aluminum compounds and nitrogen compounds, with calcium salts being the most preferred. Preferably, the one or more cations is present in the solution at a concentration of from about 0.1 to about 5% by weight, more preferably from about 0.2 to about 2.5% by weight.

The exposure of the food pieces to the enzyme solution, optionally including cations as described above, or the cation solution without enzymes, provides various improved properties to the snack food product. The term "improved property" is defined herein as any property of a snack food product that is altered by the action of the one or more enzymes and/or cations relative to a snack food product in which the food pieces are not treated with such a solution. The improved property may include, but is not limited to, increased crispiness, reduced stickiness, increased firmness of the raw and/or blanched material, reduced browning from enzymatic and/or Maillard reactions, increased color brightening, increased color retention, increased color enhancement, reduced color fading, increased stiffness, increased rugged or smooth appearance, improved flavor, and reduced fat content. Many of these terms are defined more fully in U.S. Pat. No. 7,056,544, hereby incorporated by reference. The other terms are defined in accordance with their customary meaning as would be apparent to those of ordinary skill in the art.

It will be appreciated that crispness and/or stiffness can be increased in a measured or preselected way, so that, for instance, if a certain crispness or a certain stiffness is desired to achieve certain processing goals or for producing a certain finished snack food product, crispness or stiffness can be controlled by varying the amount of exposure to the one or more enzymes and/or cations.

The improved property may be determined by comparison of a snack or other food product prepared in accordance with the methods of the present invention, versus a snack or other food product prepared in accordance with prior art methods. Techniques for determining such improved properties achieved by use of the present methods are described herein. Organoleptic qualities may be evaluated using procedures well established in the food industry, and may include, for example, the use of a trained panel of sensory evaluators. Other methods could include texture analysis and comparisons such as those disclosed herein below.

Preferably, the food pieces are exposed to the enzyme solution (with or without cations), or the cation solution, for a time of about 0.5 to about 45 minutes, more preferably about 1.0 to about 15 minutes, most preferably about 2.0 to about 5 minutes.

In preferred embodiments the enzyme and/or cation treatment is applied prior to blanching. In alternative embodiments, the enzyme and/or cation treatment is applied concurrently during the blanching, or as an additional treatment after blanching. In the case of certain shaped food pieces such as sheeted products that are made from a combination of food materials or a dough, the enzyme and/or cation treatment may be applied after the shaped food pieces have been through the initial baking step that is customary in production of such products.

Blanching. Several embodiments of the present invention include a step whereby the food pieces such as fruit and/or vegetable pieces are blanched. Preferably, the food pieces are blanched for a time period sufficient to achieve any of the following: 1) to inactivate any enzymes that naturally occur on the surface of the pieces and/or to inactivate any enzymes added during the enzyme treatment step described above; 2) to gelatinize at least a portion of the naturally occurring starches; 3) to remove excess free sugars so as to reduce Maillard browning and potential for formation of acrylamides; and 4) to improve texture and flavor. Typically, the food pieces are preferably blanched by immersion in an aqueous solution, preferably containing from about 0.5% to about 8% by weight, more preferably from about 2% to about 5% by weight, most preferably about 3% by weight of one or more cations, as defined above. In preferred embodiments, the cations are selected from NaCl, KCl, $MgCl_2$ and $CaCl_2$. The blanching may be conducted at a temperature of preferably from about 60° C. to about 120° C., more preferably from about 70° C. to about 100° C. In alternate embodiments, the blanching may be conducted by exposure to steam (at ambient or higher pressures). Blanching is carried out preferably for about 15 seconds to about 10 minutes, more preferably for about 40 seconds to about 3 minutes, depending upon the amount of blanching desired. Alternatively, any known method of blanching such as microwave, Ohmic heating, super-heated steam, infrared heating and the like can be used in accordance with the present invention. Additional oil can be applied by combining it with the blanching media, e.g., water, steam and the like If necessary, the food pieces are then preferably drained or conveyed under an air curtain to remove excess water. In alternate embodiments, any known method of removing excess surface water may be employed. Salt can be added before, during or after blanching. Any salts that are suitable for use in foods may be used, but NaCl, KCl, $MgCl_2$, $CaCl_2$ and the like are preferred.

The blanching step may not be applicable and/or necessary in cases of certain shaped food pieces such as sheeted products that are made from a combination of food materials or a dough. The blanching step may not be necessary for other food pieces, e.g., meat, poultry, fish or shellfish, in which blanching is not employed in the food preparation step(s).

Oils and Oil-Water Emulsion Preparation: Any predetermined amount of digestible and/or synthetic fat, such as an oil or oil substitute, can be added to and/or blended and mixed with the dough or mixture prior to cooking or alternatively can be applied in any process such as spraying the extruded dough or the food pieces, prior to, during, or after the pre-cooking steps. Preferably, at least a part, or most preferably all of the predetermined amount of oil is added to the food pieces by immersing them in an intimate mixture of oil that will be referred to herein as an oil-water emulsion, prior to cooking the food pieces, although the food pieces can be exposed to the oil-water emulsion at preselected point(s) during the cooking/drying process.

Preferably, the oil is a cooking oil not containing fatty acids such as canola, sunflower or safflower oils, which may be applied to the vegetable pieces by either, contacting the food pieces with an all-water emulsion, spraying the oil onto the food pieces or by flash soaking the food pieces in oil or by any other feasible method, such as applying to the blanch water or spraying onto a conveyer belt or a tray before and/or after food pieces are placed onto such tray or belt. In alternate embodiments where oil is used, although any food grade oil or oil substitute can be used, the preferred oils will be unrefined oils and those having a low smoke point, preferably extra virgin olive oil, hemp seed oil, walnut oil, sesame oil, flaxseed oil, coconut oil, unrefined canola oil, semi-refined canola oil, unrefined peanut oil, safflower oil, sunflower oil, high-oleic sunflower oil, unrefined corn oil, soy oil, unrefined soy oil, unrefined sesame oil, flavor infused oils, emulsified vegetable shortening, and the like, synthetic oils such as OLESTRA™ and the like. Alternative oils that offer health benefits, such as SMART BALANCE™, ENOVA™ and the like, may be used either alone or in combination with other natural or synthetic oils such as those discussed above.

As used herein the term "oil" that is part of the oil-water emulsion can refer to liquid natural or synthetic oils that are liquid either under ambient conditions, e.g., 20-25° C. (e.g., "room temperature") or that can be liquefied at the temperatures employed during application of the oil-water emulsion to the food pieces. Therefore, the term "oil" can refer to lipids that are generally referred to in the food processing industry as "fats" because they are solid or generally solid at room temperature, such as butter or margarine. However, a mixture of such a fat and water can be heated before forming the emulsion such that the fat melts to form a liquid that can then be emulsified with the water to form the oil-water emulsion.

The term "oil-water emulsion" or "oil-water emulsion mixture," as used herein, can refer to a homogenous or substantially homogenous mixture of one or more oils and water, for example as opposed to a mixture of oil and water where the oil and water are separated into two phases with a distinct phase boundary. However, the term "oil-water emulsion" is used herein to refer to mechanically generated dispersions of oil in water or water in oil that are usually not true emulsions due to the absence of natural of synthetic surfactants. To the extent that some vegetable or animal oils inherently contain native surface-active agents, a true emulsion may form, but such emulsions are not essential to the practice of the invention.

Applying the oil-water emulsion to the food pieces, can include immersing the food pieces in the oil-water emulsion. The conditions by which the immersion of the food pieces in the oil-water emulsion is carried out can depend on several factors, including the composition of the oil-water emulsion and the desired final fat content of the food pieces.

The method can also include, before step (b), a step of preparing the oil-water emulsion, for example through mechanical means of mixing or agitating an oil phase and a water phase including, but not limited to, shaking, stirring, homogenizing, exposure to ultrasound (also referred to as sonolation), agitating, or running the oil and water phases through one or more mechanical pumps, such as high-shear pumps.

The oil-water emulsion can be formed by mixing together a predetermined amount of an oil and water. As is known in the art, oils and water are generally immiscible due to the polar nature of water and the non-polar nature of oils such that, typically, oil and water will separate into two phases, an oil phase and a water phase, in the absence of added surfactants. Nonetheless, simple vigorous mixing and other emulsification methods can cause one of the phases to be dispersed in the other (e.g., the oil phase being dispersed in the water phase, or the water phase being dispersed in the oil phase). The mixing can be performed via any mechanical method that is capable of mixing, and preferably, emulsifying the oil and water into an oil and water emulsion. Examples of mixing or emulsifying methods include, but are not limited to, homogenizing, sonolation, agitating, or running the mixture through one or a series of pumps, such as high-shear pumps.

The oil-water emulsion does not need to be stable, e.g., the emulsion need not be capable of being applied in, or remaining in, a homogenous or substantially homogenous state when and/or after it is applied to the food pieces. So long as a moisture removal step, described in more detail below, is applied relatively soon after the oil-water emulsion is applied, e.g., before the time it would take the oil-water emulsion to separate back into the water phase and the oil phase, the present method can still be effective. Therefore, the emulsion can be prepared relatively close in time to the application of the oil-water emulsion to the food pieces. Moreover, because the oil-water emulsion does not need to be stable or maintained after the application period, the emulsion does not need to be stabilized by exogenous emulsifiers or surfactants. The oil-water emulsion can, therefore, be generated by temporary mechanical means, including but not limited to: shaking, stirring, homogenizing, exposure to ultrasound, and through the use of mechanical pumps, including high-shear pumps. In a continuous process, the oil and water can be heated, if necessary, and emulsified. The oil-water emulsion can be maintained, for example by constant circulation of the oil and water through the emulsifying mechanism, and the food pieces can be passed through the emulsion for a controlled period of time, as on a moving bed at a fixed distance below the surface of the emulsion.

The fraction of oil in the oil-water emulsion, by weight, can depend on the desired amount of fat to be applied to the food pieces. In other words, the content of oil in the oil-water emulsion can be dictated by a desired final oil or fat content for the food pieces. The precise amount of oil used in the emulsion can be varied widely, e.g., from about 1.5-85 wt-%, such as about 5-75 wt-% or about 10-50 wt-%, preferably about 20-40 wt-% oil.

As described in more detail below, the amount of oil in the oil-water emulsion can depend on at least one, for example, at least two, at least three, and in some examples all four, of the following quantities: a desired final fat content of the final food product, a percentage of moisture in the final food product, the percentage of solids in the wet product, and the percentage by weight of carry-over of the oil-water emulsion onto the surface of the food piece after application of the oil-water emulsion. The desired final fat content can be chosen by the user. The percentage of moisture in the final product can also be chosen by the user, but can also generally be decided by the type of food pieces, the desired type of food product, and desired physical properties of the final food product. For example, a high moisture content can be retained in the finished food product, particularly if it is derived from fish, poultry or meat, e.g., up to about 50%.

For example, for a potato chip-type food product, a final moisture content of about 2-10 wt-% is typical. The percentage of solids in the wet food product can depend on the type of food piece, and can be readily determined. The carry-over of the oil-water emulsion to the food pieces after application can be a function of the dimensions of the food piece (such as thickness, length, etc.), a surface texture of the food piece, a viscosity of the emulsion, and a temperature at which the oil-water emulsion is applied, as well as subsequent surface loss of oil in the drying process, which can be readily determined by those versed in the art.

In an example, the oil content in the oil-water emulsion can be determined based on a predetermined, desired final fat content for the food pieces. It can first be assumed that the final amount of oil on the food pieces after the step of reducing moisture will be approximately equal to the amount of oil that the food pieces pick up during exposure to the oil-water emulsion. Individual food pieces may lose oil or gain oil, e.g., from rubbing between the food pieces during processing, but oil lost from one food piece will most likely be picked up by another food piece so that the aggregate oil loss across all the food pieces will approximately be zero. Equation [1] shows this relationship:

$$m_o = m_i \times f_{co} \times f_{oe} \quad [1]$$

where $m_o$ is the final mass of oil on the food pieces (e.g., after applying the oil-water emulsion and reducing the moisture content), $m_i$ is the initial total mass of the food pieces (e.g., before applying the oil-water emulsion), $f_{co}$ is the fractional carryover rate of oil from the oil-water emulsion onto the food piece, and $f_{oe}$ is the fractional oil content in the oil-water emulsion.

The fractional carryover rate of oil from the oil-water emulsion $f_{co}$, can be defined as the percentage, by weight, of carryover of the oil-water emulsion onto the surface of the food pieces. The fractional carryover $f_{co}$ is generally a constant that can depend on the type of food piece (i.e., what type of food, such as potatoes, apples, poultry, fish, etc.), the shape and dimensions of the food pieces (e.g., slices, sticks, or the like, and the thickness, length, or width of the slices or sticks), the surface texture of the food pieces, and the viscosity of the oil-water emulsion. In some examples, oil will be lost from the food pieces during conveyance to the moisture-reduction step or within the moisture-reduction apparatus (e.g., during drying), but this percentage of oil loss can also be folded into the fractional carryover $f_{co}$.

In some examples, it can be desirable to determine the oil content of the oil-water emulsion that should be used based on the desired final fat content of the food pieces. Therefore, Equation [1] can be solved for the oil fraction of the oil-water emulsion, as shown in Equation [2].

$$f_{oe} = \frac{m_o}{m_i \times f_{co}} \quad [2]$$

The mass of oil on the food pieces $m_o$ can be rewritten as the product of the fractional oil content on the food pieces, $f_o$, and the final mass of the food pieces, $m_{fp}$. The mass of the food pieces $m_{fp}$ can be split into its three components, the mass of the solids of the food pieces, $m_s$, the final mass of water on the food pieces, $m_w$, and the mass of the oil on the food pieces $m_o$. Combining these expressions, the mass of the oil $m_o$ can be redefined by Equation [3].

$$m_o = f_o(m_s + m_w + m_o) \quad [3]$$

Equation [3] can be inserted into Equation [2] to produce Equation [4].

$$f_{oe} = \frac{f_o}{f_{co}} \times \frac{(m_s + m_w + m_o)}{m_i} \quad [4]$$

The fraction $m_s/m_i$ is the same as the initial fractional solids content $f_s$ of the food pieces, which will generally be a known or easily determinable property of the food pieces. Replacing this fraction with $f_s$ results in Equation [5].

$$f_{oe} = \frac{f_o}{f_{co}}\left(f_s + \frac{m_o}{m_i} + \frac{m_w}{m_i}\right) \quad [5]$$

Equation [5] can be manipulated slightly to result in Equation [6].

$$f_{oe} = \frac{f_o}{f_{co}} \times f_s\left(1 + \frac{m_o}{m_i \times f_s} + \frac{m_w}{m_i \times f_s}\right) \quad [6]$$

As described above, $f_s$ can be defined as $m_s/m_i$, so that Equation [6] can be rewritten as Equations [7] and [8].

$$f_{oe} = \frac{f_o}{f_{co}} \times f_s\left(1 + \frac{m_o}{m_i(m_s/m_i)} + \frac{m_w}{m_i(m_s/m_i)}\right) \quad [7]$$

$$f_{oe} = \frac{f_o}{f_{co}} \times f_s\left(1 + \frac{m_o}{m_s} + \frac{m_w}{m_s}\right) \quad [8]$$

The fraction $m_o/m_s$ is the same as the oil fraction in the food pieces, defined as $f_o$ above, and the fraction $m_w/m_s$ is the water fraction in the food pieces, which can be defined as $f_w$. Substituting these fractions with $f_o$ and $f_w$ in Equation [8] can provide a user-friendly Equation [9].

$$f_{oe} = \frac{f_o}{f_{co}} \times f_s(1 + f_o + f_w) \quad [9]$$

Equation [9] provides an equation that allows a user to determine the fraction of oil $f_{oe}$ that should be used in the oil-water emulsion as a function of the following four parameters:

(1) a desired final fraction of oil on the food pieces, designated as $f_o$ in Equation [9], which is the target parameter and can be set by the user;

(2) a loss-adjusted carry-over fraction, which can fold in properties of the food piece, such as food piece geometry, thickness, surface texture, etc., and properties of the oil-water emulsion, such as viscosity and temperature of the oil-water emulsion during application, designated as $f_{co}$ in Equation [9], which, as noted above, can be readily determined by the user;

(3) the initial solids fraction of the food pieces, designated as $f_s$ in Equation [9], which can be known or readily determined by a user; and (4) the final moisture fraction $f_w$, which can also be selected by the user, but which is often set depending on the type of food product, e.g., about 2 wt % for potato chips.

As noted above, if an oil is to be used that is solid or substantially solid at room temperature, the solid oil can be heated to above its melting point to form a heated liquid oil either before or after contacting the oil with the water so that the now liquid oil can be emulsified or substantially homogenously mixed with the water to form the oil-water emulsion.

The oil-water emulsion can also include other additives, such as one or more cations, one or more nutritional additives, one of more flavoring additives, and one or more edible non-toxic surfactants. In an example, the oil-water emulsion can include from about 0.5 wt-% to about 8 wt-%, such as from about 2 wt-% to about 5 wt-%, for example about 3 wt-% of one or more cations, as defined above. In some examples, the cations in the oil-water emulsion can be selected from NaCl, KCl, MgCl$_2$ and CaCl$_2$.

Examples of nutritional additives, if included in the oil-water emulsion, that can be used include, but are not limited to, nutrients, vitamins, and minerals, such as Vitamin A, Vitamin, B6, Vitamin B12, Vitamin C, Vitamin D, Thiamin, Riboflavin, Niacin, Folic Acid, Phosphorous, Magnesium, Copper, Calcium, Zinc, and Iron. The inclusion of nutritional additives in the oil-water emulsion can result in a food product that is nutritionally fortified and provides an opportunity to make snack food products that are healthier. In an example, the oil-water emulsion can include from about 0.25 wt-% to about 5 wt-% nutritional additives. Examples of flavoring additives, if included in the oil-water emulsion, that can be used include, but are not limited to, flavor enhancers and seasoning blends, such as table salt (NaCl), sugar (e.g., sucrose or fructose), herb extracts, adjuvants or flavorings, such as fruit extracts, vegetable extracts, and the like, or a combination thereof can be included in the respective flavorings, salt, sugar, herbs, fruits, vegetables, and the like, in the oil-water emulsion, which can thereby incorporate these flavoring components into the food pieces. Alternately, the food pieces can be soaked in or infused with concentrated flavor extracts before applying the oil-water emulsion, wherein the concentrated flavor extracts can be aqueous or non-aqueous. In an example, the oil-water emulsion can include from about 0.25 wt-% to about 5.0 wt-% flavoring additives.

Oil-Water Emulsion Application: The processes described herein can include one or more steps whereby an oil-water emulsion can be applied to the food pieces. In an example, application of the oil-water emulsion can be via immersion of the food pieces in a bath of the oil-water emulsion for a predetermined period of time and at a predetermined temperature. However, other methods of applying the oil-water emulsion can be used, such as spraying, pouring, painting, and the like.

Immersing the food pieces in the oil-water emulsion can be preferred because it can lead to an even application of the oil-water emulsion. In an example, the food pieces can be immersed in the oil-water emulsion for a time period and temperature sufficient to apply a predetermined amount of the oil-water emulsion to the food pieces. The immersion in the oil-water emulsion can also provide for one or more of the following additional goals, similar to blanching of food pieces: (1) to inactivate any enzymes that naturally occur on the surface of the pieces and/or to inactivate any enzymes added during the enzyme treatment step described above; (2) to gelatinize at least a portion of the naturally occurring starches; (3) to remove excess free sugars so as to reduce Maillard browning and potential for formation of acrylamides; and (4) to improve texture and flavor. In an example, the time and temperature of application in the oil-water emulsion can be sufficient to achieve at least one of the additional goals listed above, for example at least two of the additional goals, such as at least three of the additional goals, and in some examples, all four of the additional goals can be achieved by the application of the oil-water emulsion.

If the application of the oil-water emulsion is intended to perform a blanching function (e.g., one or more of inactivating enzymes, gelatinizing starches, removing excess free sugars, and improving texture and flavor), then the oil-water emulsion can be heated to a temperature and the food pieces can be immersed in the oil-water emulsion for an amount of time that is sufficient to blanch the food pieces and to provide for application of a predetermined amount of oil to the food pieces from the oil-water emulsion. If it is found desirable to contact the food pieces with the oil-water emulsion for a period of time and/or temperature that is not sufficient to blanch the food pieces, then a separate blanching step using water, oil, an oil-water mixture, steam at ambient or higher pressure, or dry blanching, can be employed.

The emulsion application is preferably conducted at ambient temperatures of about 20-30° F. but can be conducted over a wide temperature range, e.g., from about −20 to about 250 degrees F., e.g., about 0° C. (about 32° F.) to about 100° C. (about 212° F.), such as from about 60° C. (about 140° F.) or about 65° C. (about 150° F.) to about 93° C. (about 200° F.) or about 100° C. (about 212° F.), and over a wide range of time periods, e.g., from about 1-2 seconds to about 1-2 hours, preferably from about 3 seconds to about 1 hour, e.g., from 15 seconds to about 5 minutes, or from about 5 seconds to about 15 seconds. Preferably the time and temperature are selected so a substantial amount of water is not lost, e.g., a temperature below 100° C. (about 212° F.), preferably below 35° C.

The emulsion may be applied under conditions using various pressures, including atmospheric pressure under the ambient, at the ambient of above ambient pressure. Accordingly, the emulsion will be applied to the food pieces and products in open chambers or in closed chambers under high pressure and/or under vacuum conditions.

However, the food pieces need not be partially cooked or "blanched" in this step, and preferable will not be blanched in this step. If a separate blanching step is needed, it may be conducted at a temperature of from about 60° C. (about 140° F.) to about 120° C. (about 250° F.), such as from about 65° C. (about 150° F.) to about 100° C. (about 212° F.), or from about 60° C. (about 140° F.) to about 93° C. (about 200° F.) or to about 98° C. (about 210° F.). The blanching can be conducted for about 15 seconds to about 10 minutes, such as from about 40 seconds to about 3 minutes, depending upon the amount of cooking desired.

The oil-water emulsion can be heated and circulated during the application step, and homogeneity can be maintained as disclosed hereinabove. The food pieces can be agitated during application and exposure to the oil-water emulsion.

In some examples, the food pieces can be rinsed, then drained or conveyed under an air curtain to remove excess emulsion. In alternate embodiments, any known method of removing excess surface liquid can be employed. Salt can be added before, during or after application of the oil-water emulsion. Any salts that are suitable for use in foods can be used, but NaCl, KCl, MgCl$_2$, CaCl$_2$ and the like are preferred.

Reducing Moisture Level ("Cooking" or "Drying"). The moisture in the food pieces is preferably reduced to a moisture level of about 0.2 to about 80% by weight, preferably about 0.5 to about 5% by weight. This moisture reduction follows the pretreatment steps described above and may be achieved in a number of different ways.

In one embodiment of the invention, the moisture reduction step includes cooking the food pieces in one or more dryers or ovens independently selected from the group consisting of forced air convection ovens, fluidized bed dryers/ovens, vibrating fluidized bed dryers/ovens, impingement dryers/ovens, pulsed fluidized bed dryers/ovens (e.g., Aero Pulse dryers), rotary dryers/ovens, rotary drum dryers/ovens, rotary spiral drum dryers/ovens, tray ovens, stationary dryers/ovens, spiral roasters/dryers (such as, for example, FMC Spiral Roto-Louvre Roaster/Dryers), microwave dryers/ovens, infrared dryers/ovens, super heat airless driers, vacuum driers, vacuum belt dryers and ohmic dryers, or any similar drying/cooking apparatus that can be operated in the absence of frying the food pieces in oil.

In one embodiment, the food pieces are cooked for about 0.5 to about 40 minutes at a drier/oven(s) temperature of from about 160° F. (70° C.) to about 400° F. (205° C.), more preferably from about 275° F. (135° C.) to about 325° F. (165° C.) with an air velocity of about 500-1500 feet/min.

In another embodiment of the invention, the moisture reduction comprises bringing the food pieces to a first drier/oven(s) temperature for a first time period, and thereafter bringing the food pieces to a second drier/oven(s) temperature for a second time period. Preferably, bringing the food pieces to the first drier/oven(s) temperature for the first time period, such as but not limited to a oven/drier(s) temperature of about 160° F. to about 400° F., preferably between about 300° F. to about 400° F., e.g., about 325° F.-380° F. for a time of about 0.5 to about 40 minutes.

This first stage reduces the initial moisture level to an intermediate moisture level, e.g., of about 80-89 wt-% to about 10% to about 80% by weight, e.g., about 35-70 wt-% or about 40-65 wt-%. The food pieces are optionally subsequently dried in the first or the second drier/oven(s) temperature for the second time period, such as but not limited to an oven/drier temperature of about 160° F. to about 375° F., preferably between about 250° F. and about 350° F., and more preferably between about 260° F. to about 290° F. for a time of about 4 to about 35 minutes, preferably about 5 to about 12 to about 15 minutes and more preferably about 6 to about 11 minutes. This two stage cooking procedure reduces the intermediate moisture level to the final moisture level of about 0.5 to about 10%. In preferred embodiments, the second temperature or temperature range is lower than the first temperature, or temperature range.

In three-stage moisture reduction steps, the third temperature is preferably lower than the first and the second temperatures. However, the oven/drier temperatures in any stage can be varied within the ranges given.

The actual moisture content selected after any stage can depend on the type of food piece being processed and the desired type of final food product. For example: potato food pieces that are being prepared as French fries typically can have a final moisture content that is higher than potato chips.

In other examples, the first stage of the moisture reduction process can comprise drying the food pieces in a rotary dryer, a rotary drum dryer, a rotary spiral drum dryer, a fluidized bed dryer/oven, a vibrating fluidized bed dryer/oven, or a microwave dryer/oven, to remove up to about 20-30% by weight, such as up to about 40% by weight, for example up to 50% by weight, such as up to about 60% by weight, for example up to 70% by weight, such as up to 75% by weight, for example up to 80% by weight, such as up to 85% by weight, for example up to 89% by weight, such as up to about 90% by weight of the initial moisture of the food pieces. Thereafter, the optional second cooking stage, and optionally, a third stage, can reduce the moisture level to a desired final moisture level, such as from about 0.5 wt-% to about 10 wt-%, e.g., to about 2-3 wt-% to about 5-7 wt-%.

In an example, the food pieces to which the oil-water emulsion is applied can be dehydrated in a first step using a rotary dryer, a rotary drum dryer, a rotary spiral drum dryer, or any similar apparatus at a temperature preferably ranging from about 93° C. (about 200° F.) to about 200° C. (about 390° F.), such as from about 135° C. (about 275° F.) to about 175° C. (about 350° F.), such as from about 150° C. (about 300° F.) to about 163° C. (about 325° F.) for a time interval of from about 2 minutes to about 20 minutes, such as from about 5 minutes to about 15 minutes, for example from about 8 minutes to about 12 minutes prior to further cooking in an impingement oven/dryer, fluidized bed oven/dryer (including their vibratory versions), microwave oven/dryer, aero pulse oven/dryer, conviction oven/dryer, tray oven/dryer, stationary oven/dryer, continuous belt oven/dryer of any type or the like. Alternatively, in another example, a fluidized bed oven/dryer (such as, for example, those available from The Witte Company, or the Carrier Vibrating Equipment, Inc. or the like) can be used in a process of pre-drying (dehydrating) food products in place of a rotary dryer of any type, as described above. In yet another example, the entire drying or dehydrating process can be achieved by using a fluidized bed oven/dryer (or a set thereof) such as those mentioned above.

In an example, the partially dehydrated cut food pieces can then be transferred to an impingement oven, a fluidized bed dryer/oven or any other similar equipment via a conveyor belt or any other conveying device or method. The partially dehydrated cut food pieces can then be cooked at oven/drier temperatures of about 107° C. (about 225° F.) to about 190° C. (about 375° F.), such as from about 135° C. (about 275° F.) up to about 177° C. (about 350° F.), for example from about 150° C. (about 300° F.) up to about 163° C. (about 325° F.) for a period of from about 4 minutes to about 15 minutes, such as from about 6 minutes to about 12 minutes, for example from about 8 minutes to about 10 minutes. The resultant snack food products can then be cooled and optionally seasoned as desired and packaged for distribution and consumption.

In still other examples, the reduction of the moisture level to the final moisture level of about 0.5 wt-% to about 10 wt-% can be accomplished solely using a rotary dryer, rotary drum dryer, rotary spiral drum dryer, fluidized bed dryer/oven or vibrating fluidized bed dryer/oven, in one or more, e.g., 2 or 3, drying steps. No additional cooking procedure need be utilized in this example. Generally the same temperature and time conditions indicated above can be used in such an example, over one or more stages, although it is preferred that, in a two stage drying process that the second temperature is lower than the first temperature.

Another example of moisture reduction can be drying/cooking with the use of spiral roasters/dryers. The drying principles and product behavior for this method closely mirror rotary ovens and rotary drum drying, except the internal spiral allows for precise control of drying time within the vessel. Typically, in spiral roaster/dryers the drying air entry into the product bed between the spiral flights can be through a perforated plate or screen wrapped around the flights. Precise control of drying time within the vessel combined with the use of this method can result in a higher product quality, process effectiveness and added process efficiencies and output levels not experienced or expected previously.

During any of the stages, the food pieces can be exposed to air at an air speed of from about 60 meters per minute (about 200 feet per minute) to about 4570 meters per minute (about 15,000 feet per minute). According to additional examples, even lower air velocities can be used depending on the food pieces being prepared or the equipment being used. The process is further controlled by selectively increasing or decreasing, or both, the air speed to control the exposure of the product to temperature and airflow, thereby optimizing the quality of the finished product. Sequential adjustments to temperature and airflow can allow for a controlled drying process that beneficially maintains the product temperature below temperatures that cause browning and carmelization until the product reaches a target moisture content. Manipulation of the different zones of temperature and air velocity allow for optimization of the texture, color, and flavor, as well as economical efficiency of the process.

During any of the stages, the food pieces may be exposed to air at an air speed of from about 200 to about 15,000 feet per minute. According to additional, alternative embodiments of the present invention, even lower air velocities may be used depending on the food pieces being prepared and/or the equipment being used. The process is further controlled by selectively increasing and/or decreasing the air speed to control the exposure of the product to temperature and airflow, thereby optimizing the quality of the finished product. Sequential adjustments to temperature and airflow allow for a controlled drying process that beneficially maintains the product temperature below temperatures that cause browning and carmelization until the product reaches a target moisture content. Manipulation of the different zones of temperature and air velocity allow for optimization of the texture, color, and flavor, as well as economical efficiency of the process.

Other equipment, such as, for example, any similar type rotary dryer or rotary drum dryer, "flash dryers", airless or superheated steam dryer and the like such as, for example, those available from Applied Chemical Technologies, Carrier Vibrating, Inc., The Dupps Company and the like, may be used in place of the dryers. Alternatively, microwave, infrared, impingement, vibrating impingement, tray oven, convection oven, stationary oven, fluidized bed or vibrating fluidized bed drying, vacuum drying, vacuum belt drying or the like can be employed in the process of partially or completely dehydrating the cut food pieces, each resulting in a different degree of efficiency and level of output. The use of a steam blancher, such as those available from the Lyco Company, alone or in combination with any of the foregoing equipment, provide numerous additional alternatives for either a partial or complete dehydrating process. When applicable, any versions of the foregoing equipment described herein in relation to the various embodiments of the present invention, such as, for instances, batch or continuous processing equipment, static or vibrating equipment designs and the like may be employed.

Moisture sensing equipment such as those available from Drying Technologies, Inc. (i.e., DTI 500, DTI 5000) and the like can be installed inside the rotary dryer or the like to ensure proper drying conditions on an automated basis.

In preferred embodiments, the partially dried food pieces are then transferred to an impingement oven, a fluidized bed dryer/oven, a vibrating fluidized bed dryer/oven, a vacuum belt dryer/oven or any other similar equipment via a conveyor belt or any other conveying device or method. After moisture reduction to the final level, the resultant snack food products may then be cooled either at ambient or reduced temperatures, and optionally seasoned and/or coated as desired and packaged for distribution and consumption.

Optional seasoning blends can be applied to products preferably using adhesives such as gums, starches, proteins, that can be used to create a sticky surface on the products for adherence of the seasoning blends as is generally known within the food industry.

The crispness of the resulting snacks food products, preferably chips or strips, is believed to be generated by several factors including the cook-out of the starch, the resulting moisture content, the thickness of the resulting food portion, exposure time to enzymes, surface area per cation/enzyme concentrations, drying curve, cooking time and temperature, the variety of vegetable, potato or type of plant food product used. It is believed that if vegetable pieces are dried too fast, the surfaces seal and inside moisture cannot escape, resulting in big pockets of moisture that is believed to be undesirable. On the other hand, if the vegetable pieces are dried too slowly, they may just get hard like dehydrated potatoes, so it is believed to be preferable to find a middle ground in this regard.

To obtain a blistered effect on the product surface similar to the typical appearance observed when foods are fried, the food pieces are preferably cooked at an oven/drier temperature of at least 265° F. after about halfway through the moisture removal. Next, the food pieces are cooked at an oven/drier temperature of about 310° F. with a high velocity air flow (e.g., an air speed of about 500 to about 15,000 feet per minute) to achieve a final moisture content of about 2 to about 5%. The final drying when using certain types of equipment such as a vacuum dryer may take place at temperatures below those indicated above.

The process efficiency can be further improved by, after the moisture reduction is complete, running the food pieces through an "Equilibrator" system, that takes the hot product, exhausts the air from it, pulling off the heat thereby cooling it as the final moisture is removed.

The invention also contemplates reducing the moisture level down to the intermediate moisture level by any of the methods described herein, cooling and storing the moist product at ambient, refrigeration or freezer conditions, then subsequently frying, drying or baking the product to achieve the final moisture level. Alternatively, the frying step may immediately follow the steps of reducing the moisture level down to the intermediate moisture level.

In addition, the invention contemplates flash frying or baking any of the snack food products prepared in accordance with the invention, either in a commercial or retail setting or at home.

The present invention also includes snack food products made by any of the methods described herein.

Other aspects and advantages of the present invention will be understood upon consideration of the following illustrative and comparative examples.

Example 1

Potato Chips: Approximately 2,333 grams of Yukon Gold variety potatoes were washed, then sliced to an average slice thickness of 1.90 mm, yielding approximately 2288 grams of sliced potatoes. The sliced potatoes were rinsed for 15 seconds in cold water (18° C./65° F.) and drained. The drained potato slices were placed in a solution of 0.5% amylase (American Labs, Inc. Fungal Amylase-100,000 SKB/gram Lot A1100517-04) and 1% aqueous Calcium Chloride (32% aqueous solution Calcium Chloride from DSM Food Specialties) and held for 3 minutes before draining After draining, the treated potato slices were blanched in 93° C. (200 degrees F.) water containing 3% salt (NaCl) (Cargill Top Flow Salt) for 1 minute. Blanched potato slices were dipped into cold water for about 15 seconds to halt cooking, then drained. The potato slices were then placed directly on a conveyor belt of an impingement oven (Impinger® I, Model No. 1240 from Lincoln Food Service Products, Inc., Fort Wayne, Ind.) set at 140° C./285° F. and belt time of 13.25 minutes. After drying, the potato chips were allowed to cool completely, then placed in moisture proof bags and sealed. The total yield was 467 grams of potato chips. The resulting chips were observed visually and determined to have a light golden color, a good potato chip flavor and a crisp light texture.

Samples were analyzed for moisture using the convection oven method; by measuring the weight lost as a result of heating a ground sample (4 grams, run in triplicate) in a convection oven under controlled conditions (100° C. for 24 hours). The percent of weight lost was reported as the percent of moisture in the sample. In this example, the final moisture content was 4.42%.

Samples were analyzed for fat using the chloroform extraction method of F. I. Shahii (see reference provided below) with minor variations:

Prior to extraction, the sample is ground in a blender.
1. Prepare a 2:1 solution of chloroform: methanol.
2. Measure 10 g of ground sample into a flask; add 50 mls of 2:1 chloroform/methanol solution.
3. Stir covered for 1 hour.
4. Pour into a clean flask through filter paper.
5. Rinse the initial flask and remaining solids into the new flask with a small amount of the 2:1 solution of chloroform: methanol.
6. Add 30-35 mls of distilled water and mix.
7. Let sit at 4° C. overnight.
8. Remove settled top layer containing water and methanol with a water aspirator and glass pipette.
9. Weigh a new round bottom flask and record.
10. Pour the remaining solution into the new flask through a filter, pass the remaining layer of chloroform (and fat) over sodium sulfate to remove any remaining water. Wash all of the fat into the flask using additional chloroform.
11. Using a rotovap at 50° C./80 rpm, remove (by evaporation) the remaining chloroform.
12. Place flask in the chemical fume hood overnight to completely evaporate any remaining chloroform.
13. Weigh flask after drying is complete, record and determine the amount of fat.

The results indicated that the samples contained an average of about 0.30% fat. The average final thickness of the sample chips after drying was determined to be 1.38 mm by measuring thickness of 10 chips using digital calipers.

The "chloroform method" is based upon the method disclosed by F. I. Shahii, "Extraction and Measurement of Total Lipids", *Current Protocols in Food Analytical Chemistry*, John Wiley and Sons, 2003, pp D1.1.4.

The "moisture method" is based upon the method disclosed by R. P. Ruis, "Gravimetric Determination of Water by Drying and Weighing: Measuring Moisture using a Convection Oven", *Current Protocols in Food Analytical Chemistry*, John Wiley and Sons, 2003, pp A1.1.1.

The texture of the potato chips was evaluated using a TA.XT2 Texture Analyzer using a 0.25" diameter ball probe and a chip/cracker fixture. Individual chips were rested over the 18 mm diameter opening on the plate's cylindrical opening, and were punctured with the ball probe. The ball probe traveled at 4.0 mm/s until a force of 10 grams was detected; then the ball probe was punctured through the chips at a speed of 1.0 mm/second. The probe was withdrawn at 10.0 mm/second. A sampling of 25 chips was used for each test. Analysis of the test chips resulted in an average peak force of 379 grams, which is statistically similar to LAY'S® Light Chips (OLESTRA™) 825.59 grams of force and Low Fat KETTLE KRISPS™ at 416.06 grams of force. LAY'S® Classic was slightly less at 254.23 grams of force.

Test 1: Comparison of Chip Attributes: Samples of Potato Chips of the Present Invention prepared by the process described in Example 1 compared with popular chips currently in the market.

TABLE 1

Comparison of Chip Attributes.

| Sample | Fat g/oz. | Percent Fat | Percent Moisture | Average Thickness (mm) | Texture Analysis Grams of force | Ratio of % Moisture to % Fat |
|---|---|---|---|---|---|---|
| Test Product | 0.084 | 0.30%* | 4.42% | 1.38 | 379.87 | 14.73 |
| LAYS ® Classic | 10** | 35.71%** | 3.80% | 1.44 | 254.23 | 0.11 |
| LAYS ® Light (Contains Olestra ™) | 0** | 0%** | 3.45% | 1.40 | 325.59 | 0 |
| Lightly Salted Kettle Chips | 8** | 28.57%** | 4.26% | 1.30 | 583.87 | 0.15 |
| Low Fat Kettle Krisps | 1.5** | 5.36% | 4.99% | 1.55 | 416.06 | 0.93 |
| Terra Yukon Gold ™ | 6** | 21.42%** | 6.27% | 2.15 | 1090.40 | 0.29 |

*Fat analysis by Chloroform Extraction Method
**Information from Nutritional Label Test 2: Density measurement of potato chips using the multipycnometer. The multipycnometer (Quantachrome model MVP-D160-E) employs the technique of fluid displacement to determine volume. The fluid used in the instrument is helium. Potato chip volume was determined by measuring the pressure difference when a known quantity of helium is allowed to flow from a known reference volume into the sample cell containing the chips. Samples were weighed before measuring the volume. Each chip was broken into 2-4 pieces to allow them to fit into the measuring cell. Densities were calculated using the formula:

$$\frac{W}{V_C - \{V_R * [(P_1/P_2) - 1]\}}$$

W=weight of potato chips (g)
$V_C$=Cell volume (cm$^3$)*
$V_R$=Reference volume (cm$^3$)*
$P_1$=pressure reading of the reference
$P_2$=pressure reading of the cell
*$V_C$ and $V_R$ were established during instrument calibration.

TABLE 2

Pycnometer Density Calculations of Potato Chips.

| Sample | Replicates | Density g/(cm³) | Average g/(cm³) |
|---|---|---|---|
| Test Product (regular) | 1 | 1.345 | 1.351 |
| | 2 | 1.359 | |
| | 3 | 1.350 | |
| Test Product (wavy) | 1 | 1.281 | 1.291 |
| | 2 | 1.315 | |
| | 3 | 1.278 | |
| LAY'S ® Classic | 1 | 1.178 | 1.191 |
| | 2 | 1.197 | |
| | 3 | 1.197 | |
| Low Fat Kettle Krisps | 1 | 1.373 | 1.355 |
| | 2 | 1.327 | |
| | 3 | 1.365 | |
| Ruffles ® | 1 | 1.156 | 1.171 |
| | 2 | 1.181 | |
| | 3 | 1.175 | |

Example 2

Regular Fat-Free Potato Sticks: Russet Burbank Potatoes were peeled and cut Julienne style lengthwise to achieve approximately 2 mm height and width. After slicing 540 grams of these, the raw potato sticks were rinsed for under 65° F. running water for 15 seconds. Then the rinsed sticks were held in a solution containing 500 grams water (43° C./110° F.), 5 grams bacterial amylase (Lot No. ALI05175-04, American Laboratories, Inc.), 5 grams calcium chloride solution (32% solution Calcium Chloride from DSM Food Specialties) for 3 minutes. The enzyme treated potato sticks were drained, then blanched in 87° C./190° F. water containing 3% Cargill Sea Salt (3000 g cold water, plus 90 g salt) for 1 minute 30 seconds before draining Blanched potato sticks were placed directly on perforated aluminum tray and put into an impingement oven (Impinger® I, Model No. 1240 from Lincoln Food Service Products, Inc., Fort Wayne, Ind.) set at 140° C./285° F. Oven belt speed was set at 24 minutes. Every 5 minutes, the tray was shaken to stir the potato sticks to allow for even drying. The process yielded approximately 103 grams of fat-free potato sticks, which were then cooled and packaged. The potato sticks were evaluated by trained sensory professionals and were noted to have a pleasant cooked potato flavor, golden color, and light crisp texture.

Example 3

Larger Size, Puffed Potato Strips: Yukon Gold potatoes were peeled and cut slices approximately 2 mm thick. These slices were then cut into strips approximately 6 mm wide. Approximately 750 grams of these raw potato strips were rinsed under 65° F. running water for 15 seconds. Then the rinsed strips were held in a solution containing 500 grams water (43° C./110° F.), 5 grams bacterial amylase (Lot No. ALI05175-04, American Laboratories, Inc.), 5 grams calcium chloride (32% solution Calcium Chloride from DSM Food Specialties) for 3 minutes. The enzyme treated potato strips were drained, then blanched in 87° C./190° F. water containing 3% Cargill Sea Salt (3000 g water, plus 90 g salt) for 1 minute 30 seconds before draining. The blanched potato strips were placed directly on perforated aluminum tray and put into an impingement oven (Impinger® I, Model No. 1240 from Lincoln Food Service Products, Inc., Fort Wayne, Ind.) set at 135° C./275° F. Oven belt speed was set at 27 minutes. Every 5 minutes, the tray was shaken to stir the potato strips to allow for even drying. The process yielded approximately 129 grams of fat-free potato strips, with a light texture, approximately 90% of the strips puffed into almost cylindrical shape, giving them the appearance of crispy French fries. The fat-free potato strips were judged by trained sensory professionals to have a very rich buttery flavor, crisp light texture and appetizing appearance.

Example 4

Carrot Chips: Carrots were peeled and cut into slices approximately 2 mm thick. Approximately 500 grams of these carrot slices were rinsed under 65° F. running water for 15 seconds. Then the rinsed carrot slices were held in a solution containing 500 grams water (43° C./110° F.), 5 grams bacterial amylase (Lot No. ALI05175-04, American Laboratories, Inc.), 5 grams calcium chloride (32% solution Calcium Chloride from DSM Food Specialties) for 3 minutes. The enzyme treated carrot slices were drained, then blanched in 87° C./190° F. water containing 2% Cargill Sea Salt (2000 g water, plus 40 g. salt) for 1 minute 15 seconds before draining. The blanched carrot slices were placed directly on belt of an impingement oven (Impinger® I, Model No. 1240 from Lincoln Food Service Products, Inc., Fort Wayne, Ind.) set at 135° C./275° F. Oven belt speed was set at 15 minutes. The process yielded approximately 120 grams of fat-free carrot chips, with a light texture, bright orange color and pleasant sweet carrot flavor.

Example 5

Fat-Free Beet Chips: Fresh red beets were peeled and cut into slices approximately 1.6 mm thick. Approximately 590 grams of these beet slices were rinsed under 65° F. running water for 15 seconds. Then the rinsed beet slices were held in a solution containing 500 grams water (43° C./110° F.), 5 grams bacterial amylase (Lot No. ALI05175-04, American Laboratories, Inc.), 5 grams calcium chloride (32% solution Calcium Chloride from DSM Food Specialties) for 3 minutes. The enzyme treated beet slices were drained, then blanched in 87° C./190° F. water containing 2% Cargill Sea Salt (2000 g water, plus 40 g salt) for 1 minute 15 seconds before draining. The blanched beet slices were placed directly on belt of an impingement oven (Impinger® I, Model No. 1240 from Lincoln Food Service Products, Inc., Fort Wayne, Ind.) set at 135° C./275° F. Oven belt speed was set at 15 minutes. The process yielded approximately 130 grams of fat-free beet chips, with a light, crisp texture, dark beet red color and pleasant beet flavor.

Example 6

Fat-Free Parsnip Chips: Fresh parsnip roots were peeled and cut into slices approximately 1.6 mm thick. Approximately 500 grams of these parsnip slices were rinsed under 65° F. running water for 15 seconds. Then the rinsed parsnip slices were held in a solution containing 500 grams water (43° C./110° F.), 5 grams bacterial amylase (Lot No. ALI05175-04, American Laboratories, Inc.), 5 grams calcium chloride (32% solution Calcium Chloride from DSM Food Specialties) for 3 minutes. The enzyme treated parsnip slices were drained, then blanched in 87° C./190° F. water containing 2% Cargill Sea Salt (2000 g water, plus 40 g salt) for 1 minute 15 seconds before draining Blanched parsnip slices were placed directly on belt of an impingement oven (Impinger® I, Model No. 1240 from Lincoln Food Service Products, Inc., Fort Wayne, Ind.) set at 135° C./275° F. Oven belt speed was set at 13 minutes. The process yielded approximately 120 grams of fat-free parsnip chips, with a light, crisp texture, creamy tan color and pleasant parsnip flavor.

Example 7

Fat-Free Yucca Root (Maniac or Cassava) Chips: Fresh yucca roots were peeled and cut into slices approximately 1.6 mm thick. Approximately 1000 grams of these yucca root slices were rinsed under 65° F. running water for 15 seconds. Then the rinsed yucca root slices were held in a solution containing 750 grams water (43° C./110° F.), 7.5 grams bacterial amylase (Lot No. ALI05175-04, American Laboratories, Inc.), 7.5 grams calcium chloride (32% solution Calcium Chloride from DSM Food Specialties) for 3 minutes. The enzyme treated yucca root slices were drained, then blanched in 87° C./190° F. water containing 2% Cargill Sea Salt (2000 g water, plus 40 g salt) for 1 minute 15 seconds before draining Blanched yucca root slices were placed in apple juice for 2 minutes, then drained and placed directly on belt of an impingement oven (Impinger® I, Model No. 1240 from Lincoln Food Service Products, Inc., Fort Wayne, Ind.) set at 135° C./275° F. Oven belt speed was set at 14 minutes. The process yielded approximately 200 grams of fat-free yucca root chips, with a light, crisp texture, very white in color and pleasant slightly sweet flavor.

Example 8

Fat-Free Pineapple Chips: Fresh pineapple were cored, the cored portion was then cut into slices approximately 1.6 mm thick. Approximately 500 grams of these pineapple core slices were rinsed under 65° F. running water for 15 seconds. Then the rinsed pineapple core slices were held in a solution containing 500 grams water (43° C./110° F.), 5 grams bacterial amylase (Lot No. ALI05175-04, American Laboratories, Inc.), 5 grams calcium chloride (32% solution Calcium Chloride from DSM Food Specialties) for 3 minutes. The enzyme treated pineapple slices were drained, then blanched in 87° C./190° F. water containing 2% Cargill Sea Salt (2000 g water, plus 40 g salt) for 1 minute 15 seconds before draining. The blanched pineapple slices were placed directly on belt of an impingement oven (Impinger® I, Model No. 1240 from Lincoln Food Service Products, Inc., Fort Wayne, Ind.) set at 140° C./285° F. Oven belt speed was set at 22 minutes. The process yielded approximately 128 grams of fat-free pineapple chips, with a light, crisp texture, bright yellow color and pleasant cooked pineapple flavor Example 9

Fat-Free Apple Chips: Fresh Fuji apples were washed then cut into slices approximately 2.0 mm thick. Approximately 900 grams of these apple slices were rinsed under 65° F. running water for 15 seconds, then placed in a 1% citric acid solution to prevent enzymatic browning. Then apple slices were held in a solution containing 500 grams water (43° C./110° F.), 5 grams bacterial amylase (Lot No. ALI05175-04, American Laboratories, Inc.), 5 grams calcium chloride (32% solution Calcium Chloride from DSM Food Specialties) for 3 minutes. The enzyme treated apple slices were drained, then blanched in 87° C./190° F. water containing 2% Cargill Sea Salt, 2% calcium chloride solution (2000 g water, plus 40 g salt and 40 g calcium chloride solution) for 1 minute 15 seconds before draining. The blanched apple slices were placed directly on belt of an impingement oven (Impinger® I, Model No. 1240 from Lincoln Food Service Products, Inc., Fort Wayne, Ind.) set at 140° C./285° F. Oven belt speed was set at 14 minutes. The process yielded approximately 220 grams of fat-free apple chips, with a light, crisp texture, light tan color and pleasant cooked apple flavor.

Example 10

Fat-Free Pear Chips: Fresh d'Anjou pears were washed then cut into slices approximately 2.0 mm thick. Approximately 850 grams of these pear slices were rinsed under 65° F. running water for 15 seconds, then placed in a 1% citric acid solution to prevent enzymatic browning. Then pear slices were held in a solution containing 500 grams water (43° C./110° F.), 5 grams bacterial amylase (Lot No. ALI05175-04, American Laboratories, Inc.), 5 grams calcium chloride (32% solution Calcium Chloride from DSM Food Specialties) for 3 minutes. The enzyme treated pear slices were drained, then blanched in 87° C./190° F. water containing 2% Cargill Sea Salt, 2% calcium chloride solution (2000 g water, plus 40 g salt and 40 g calcium chloride solution) for 1 minute 15 seconds before draining. The blanched pear slices were placed directly on belt of an impingement oven (Impinger® I, Model No. 1240 from Lincoln Food Service Products, Inc., Fort Wayne, Ind.) set at 140° C./285° F. Oven belt speed was set at 15 minutes. The process yielded approximately 200 grams of fat-free pear chips, with a light, crisp texture, light tan color and pleasant cooked pear flavor.

Example 11

Fat-Free Purple Sweet Potato Chips: Purple Sweet Potatoes were peeled and sliced into slices approximately 1.8 mm thick. After slicing, 1000 grams of these raw sweet potato slices were rinsed under 65° F. running water for 15 seconds. Then the rinsed slices were blanched in 87° C./190° F. water containing 2% Cargill Sea Salt (2000 g cold water, plus 40 g salt) for 1 minute 30 seconds before draining.

Blanched potato slices were placed directly on chain belt of impingement oven (Impinger® I, Model No. 1240 from Lincoln Food Service Products, Inc., Fort Wayne, Ind.) set at 140° C./285° F. Oven belt speed was set at 14 minutes. The process yielded approximately 225 grams of fat-free sweet potato chips, which were cooled and packaged. The purple sweet potato slices were evaluated by trained sensory professionals and were noted to have a very pleasant sweet flavor, novel dark purple color, and light crisp texture.

Example 12

Fat-Free Radish Chips: Fresh red table radishes were cut into slices approximately 1.75 mm thick. Approximately 500 grams of these radish slices were rinsed under 65° F. running water for 15 seconds. Then the rinsed radish slices were held in a solution containing 500 grams water (43° C./110° F.), 5 grams bacterial amylase (Lot No. ALI05175-04, American Laboratories, Inc.), 5 grams calcium chloride (32% solution Calcium Chloride from DSM Food Specialties) for 3 minutes. The enzyme treated radish slices were drained, then blanched in 87° C./190° F. water containing 2% Cargill Sea Salt (2000 g water, plus 40 g salt) for 45 seconds before draining Blanched radish slices were placed directly on belt of an impingement oven (Impinger® I, Model No. 1240 from Lincoln Food Service Products, Inc., Fort Wayne, Ind.) set at 135° C./275° F. Oven belt speed was set at 11.5 minutes. The process yielded approximately 109 grams of fat-free radish chips, with a light, crisp texture, creamy tan color and astringent radish flavor.

Example 13

Fat-Free Taro Chips: Fresh taro roots were peeled and cut into slices approximately 1.6 mm thick. Approximately 1000 grams of these taro slices were rinsed under 65° F. running water for 15 seconds. Then the rinsed taro slices were held in a solution containing 750 grams water (43° C./110° F.), 7.5 grams bacterial amylase (Lot No. ALI05175-04, American Laboratories, Inc.), 5 grams calcium chloride (32% solution Calcium Chloride from DSM Food Specialties) for 3 minutes. The enzyme treated taro slices were drained, then blanched in 87° C./190° F. water containing 2% Cargill Sea Salt (2000 g water, plus 40 g salt) for 1 minute before draining Blanched taro slices were placed directly on belt of an impingement oven (Impinger® I, Model No. 1240 from Lincoln Food Service Products, Inc., Fort Wayne, Ind.) set at 135° C./275° F. Oven belt speed was set at 12 minutes. The process yielded approximately 255 grams of fat-free taro chips, with a light, crisp texture, creamy tan color retaining the natural pink/red specks inherent in the taro root. Flavor was very mild, slightly sweet, and pleasant.

Example 14

Fat-Free Pumpkin Chips: A small fresh pumpkin (approximately 10 inches in diameter) was cut in quarters, seeds were removed, then the flesh was cut into slices approximately 1.8 mm thick. Approximately 1000 grams of these raw pumpkin slices were rinsed under 65° F. running water for 15 seconds. Then the rinsed pumpkin slices were held in a solution containing 750 grams water (43° C./110° F.), 7.5 grams bacterial amylase (Lot No. ALI05175-04, American Laboratories, Inc.), 5 grams calcium chloride (32% solution Calcium Chloride from DSM Food Specialties) for 3 minutes. The enzyme treated pumpkin slices were drained, then blanched in 87° C./190° F. water containing 2% Cargill Sea Salt (2000 g water, plus 40 g salt) for 30 seconds before draining. The blanched pumpkin slices were placed directly on belt of an impingement oven (Impinger® I, Model No. 1240 from Lincoln Food Service Products, Inc., Fort Wayne, Ind.) set at 135° C./275° F. Oven belt speed was set at 11 minutes. The process yielded approximately 246 grams of fat-free pumpkin chips, with a light, crisp texture, orange/tan color and a very mild and pleasant flavor.

Example 15

Fat-Free Rutabaga Chips: Fresh rutabagas peeled and were cut into slices approximately 1.6 mm thick. Approximately 500 grams of these rutabaga slices were rinsed under 65° F. running water for 15 seconds. Then the rinsed rutabaga slices were held in a solution containing 500 grams water (43° C./110° F.), 5 grams bacterial amylase (Lot No. ALI05175-04, American Laboratories, Inc., Omaha, Nebr.), 5 grams calcium chloride (32% solution Calcium Chloride from DSM Food Specialties) for 3 minutes. The enzyme treated rutabaga slices were drained, then blanched in 87° C./190° F. water containing 2% Cargill Sea Salt (2000 g water, plus 40 g salt) for 1 minute 10 seconds before draining. The blanched rutabaga slices were placed directly on belt of an impingement oven (Impinger® I, Model No. 1240 from Lincoln Food Service Products, Inc., Fort Wayne, Ind.) set at 135° C./275° F. Oven belt speed was set at 12.5 minutes. The process yielded approximately 134 grams of fat-free rutabaga chips, with a light, crisp texture, bright tan color and typical cooked rutabaga flavor.

Example 16

Fat-Free Zucchini Chips: Several small fresh zucchini (approximately 2.5 inches in diameter and 8 inches in length were peeled, the center core (approximately 0.5 inch diameter) was removed, then the prepared zucchini were cut into slices approximately 2.0 mm thick using a kitchen mandolin with a serrated blade. Approximately 1000 grams of these raw zucchini slices were rinsed under 65° F. running water for 15 seconds. Then the rinsed slices were held in a solution containing 750 grams water (43° C./110° F.), 15 grams dried enzyme preparation (Lot No. SI9700, Multizyme II, Enzyme Development Corp. New York, N.Y.), 10 grams calcium chloride (32% solution Calcium Chloride from DSM Food Specialties) for 3 minutes. The enzyme treated zucchini slices were drained, then blanched in 87° C./190° F. water containing 2% Cargill Sea Salt (2000 g water, plus 40 g salt) for 45 seconds before draining. The blanched zucchini slices were placed directly on belt of an impingement oven (Impinger® I, Model No. 1240 from Lincoln Food Service Products, Inc., Fort Wayne, Ind.) set at 135° C./275° F. Oven belt speed was set at 18 minutes. The process yielded approximately 96 grams of fat-free zucchini chips, with a light, crisp texture, light yellow/tan color with a very mild and pleasant flavor.

Example 17

Fat-Free Mushrooms Chips: Several small fresh button mushrooms (approximately 2.5-3 inches cap diameter) were cut into slices approximately 2.4 mm thick using a kitchen mandolin. Approximately 500 grams of these raw mushroom slices were rinsed under 65° F. running water for 15 seconds. Then the rinsed slices were held in a solution containing 750 grams water (43° C./110° F.), 15 grams dried enzyme preparation (Lot No. SI9700, Multizyme II, Enzyme Development Corp. New York, N.Y.), 10 grams calcium chloride (32% solution Calcium Chloride from DSM Food Specialties) for 3 minutes. The enzyme treated mushroom slices were drained, then blanched in 87° C./190° F. water containing 2% Cargill Sea Salt (2000 g water, plus 40 g salt) for 45 seconds before draining Blanched mushroom slices were placed a screen sheet and placed in an impingement oven (Impinger® I, Model No. 1240 from Lincoln Food Service Products, Inc., Fort Wayne, Ind.) set at 135° C./275° F. Oven belt speed was set at 22 minutes. The process yielded approximately 64 grams of fat-free mushroom chips, with a very light texture, tan color very mild and pleasant pungent cooked mushroom flavor.

Example 18

Fat Free Green Bean Sticks: Fresh green beans (Blue Lake Variety) were rinsed, the ends were trimmed, then approximately 1000 grams of these raw green beans were rinsed under 65° F. running water for 15 seconds. Next the rinsed bean pods were held in a solution containing 750 grams water (43° C./110° F.), 15 grams dried enzyme preparation (Lot No. SI9700, Multizyme II, Enzyme Development Corp. New York, N.Y.), 10 grams calcium chloride (32% solution Calcium Chloride from DSM Food Specialties) for 3 minutes. The enzyme treated bean pods were drained, then blanched in 87° C./190° F. water containing 2% Cargill Sea Salt (2000 g water, plus 40 g salt) for 4 minutes before draining. The blanched green bean pods were placed a screen sheet on belt of an impingement oven (Impinger® I, Model No. 1240 from Lincoln Food Service Products, Inc., Fort Wayne, Ind.) set at 135° C./275° F. Oven belt speed was set at 28 minutes. The process yielded approximately 172 grams of fat-free green bean snack sticks, with a light, crisp texture, green and brown in color with a very mild and pleasant flavor.

Example 19

Regular Fat Free Potato Chips, pre-processed slices held under refrigerated conditions for 1 week, then dried/cooked: Atlantic Variety chipping potatoes were peeled and sliced using a Dito Dean vegetable slicer with a C2 blade, to achieve a slice thickness of approximately 1.60 mm. After slicing, 1000 grams of these raw potato slices were rinsed for under 65° F. running water for 15 seconds. Then the rinsed slices were held in a solution containing 1000 grams water (43° C./110° F.), 10 grams bacterial amylase (Lot No. ALI05175-04, American Laboratories, Inc.) and 10 grams calcium chloride solution (32% solution Calcium Chloride from DSM Food Specialties) for 3 minutes. The enzyme treated potato slices were drained, then blanched in 87° C./190° F. water containing 2% Cargill Sea Salt (3000 g cold water, plus 60 g. salt) for 1 minute before draining. The blanched potato slices were cooled in ice water, then drained and stored in plastic bags in a cooler at 3° C./38° F. for 7 days. Samples were removed from the cooler, placed in on a metal screen in a single layer and processed in an industrial Air Force® impingement oven (Heat and Control Company, Hayward, Calif. 94545) set at 176° C./350° F. for 3.5 minutes. The partially dried potato slices were then piled together to create a bed depth of 1 inch, then processed through a second Air Force® impingement oven (Heat and Control Company, Hayward, Calif. 94545) for an additional 3.5 minutes at 148° C./300° F. The process yielded approximately 200 grams of fat-free potato chips, which were cooled and packaged. The potato chips were evaluated by trained sensory professionals and were noted to have a pleasant cooked potato flavor, golden color, and light crisp texture. The seven day holding time for the pre-processed slices did not affect the texture or flavor of the finished product.

Example 20

Novel Sweet Potato Cereal-Regular Sweet Potato Flakes: Novel Sweet Potato Cereal-Regular Sweet Potatoes were peeled and cut lengthwise into strips approximately 0.75-1 inch thick, then the strips were sliced across into small flakes approximately 2 mm thick. After slicing, approximately 1000 grams of these raw sweet potato flakes were rinsed under 65° F. running water for 15 seconds. Then the rinsed flakes were blanched in 87° C./190° F. water containing 1% Cargill Sea Salt and 0.5% calcium chloride solution (32% solution Calcium Chloride from DSM Food Specialties) (5000 g cold water, plus 50 g. salt, 25 grams calcium chloride) for 1 minute before draining. The blanched sweet potato flakes were placed directly on an aluminum screen, and put into an impingement oven (Impinger® I, Model No. 1240 from Lincoln Food Service Products, Inc., Fort Wayne, Ind.) set at 140° C./285° F. Oven belt speed was set at 17 minutes. Every 5 minutes, the screen was shaken to stir the potato flakes to allow for even drying. The process yielded approximately 284 grams of fat-free sweet potato flakes, which were cooled and packaged. The sweet potato flakes were evaluated by trained sensory professionals and were noted to have a pleasant sweet nutty flavor, golden brown color, and light crisp texture when eaten with milk in a bowl like a grain based cereal. The product retained its crisp texture for a bowl life of 7-8 minutes.

Example 21

Regular Fat-Free Potato Chips made by Initial dry with Infrared Heater, then finish dry in Impingement: Atlantic Variety chipping potatoes were peeled and sliced using a Dito Dean vegetable slicer with a C2 blade, to achieve a slice thickness of approximately 1.60 mm. After slicing, 1000 grams of the raw potato slices were rinsed for under 65° F. running water for 15 seconds. Then the rinsed slices were held in a solution containing 1000 grams water (43° C./110° F.), 10 grams bacterial amylase (Lot No. ALI05175-04, American Laboratories, Inc.) and 10 grams calcium chloride solution (32% solution Calcium Chloride from DSM Food Specialties) for 3 minutes. The enzyme treated potato slices were drained, then blanched in 87° C./190° F. water containing 2% Cargill Sea Salt (3000 g cold water, plus 60 g. salt) for 1 minute before draining. The blanched potato slices were placed on a conveyor and run under an infra-red heater unit for 30 seconds. Then the partially dried slices were immediately put into an industrial Air Force® impingement oven (Heat and Control Company, Hayward, Calif. 94545) set at 176° C./350° F. for 3 minutes. The partially dried potato slices were then piled together to create a bed depth of 1 inch, then processed through a second Air Force® impingement oven (Heat and Control Company, Hayward, Calif. 94545) for an additional 3 minutes at 148° C./300° F. The process yielded approximately 200 grams of fat free potato chips, which were cooled and packaged. The potato chips were evaluated by trained sensory professionals and were noted to have a pleasant cooked potato flavor, golden color, and light crisp texture.

Example 22

Regular Fat-Free Potato Chips made by Initial dry in Microwave, then finish dry in Impingement oven: Atlantic Variety chipping potatoes were peeled and sliced using a Dito Dean vegetable slicer with a C2 blade, to achieve a slice thickness of approximately 1.60 mm. After slicing, 1000 grams of the raw potato slices were rinsed for under 65° F. running water for 15 seconds. Then the rinsed slices were held in a solution containing 1000 grams water (43° C./110° F.), 10 grams bacterial amylase (Lot No. ALI05175-04, American Laboratories, Inc.) and 10 grams calcium chloride solution (32% solution Calcium Chloride from DSM Food Specialties) for 3 minutes. Enzyme treated potato slices were drained, then blanched in 87° C./190° F. water containing 2% Cargill Sea Salt (3000 g cold water, plus 60 g. salt) for 1 minute before draining. The blanched potato slices were placed in on plastic disc and put into a Microwave Oven (Amana RadarRange, Model No. RS415T, 1500 Watts, manufactured by Amana Appliances, Amana, Iowa) for 1 minute at full power. After microwave drying the partially dried potato slices were then placed directly on the belt in an industrial Air Force® impingement oven (Heat and Control Company, Hayward, Calif. 94545) set at 176° C./350° F. for 1.5 minutes. The potato slices were then piled together to create a bed depth of 1 inch, then ran through a second Air Force® impingement oven (Heat and Control Company, Hayward, Calif. 94545) for an additional 1.5 minutes but at 148° C./300° F. The process yielded approximately 200 grams of fat-free potato chips, which were cooled and packaged. The potato chips were evaluated by trained sensory professionals and were noted to have a pleasant cooked potato flavor, golden color, and light crisp texture.

Example 23

Larger Size, Puffed Potato Strips made by steam blanch instead of immersion blanch, Lincoln Impingement finish: Yukon Gold potatoes were peeled and cut slices approximately 2 mm thick. These slices were then cut into strips approximately 6 mm wide, 6 cm in length. Approximately 750 grams of the raw potato strips were rinsed under 65° F. running water for 15 seconds. Then the rinsed strips were held in a solution containing 500 grams water (43° C./110° F.), 5 grams bacterial amylase (Lot No. ALI05175-04, American Laboratories, Inc.), 5 grams calcium chloride (32% solution Calcium Chloride from DSM Food Specialties) for 3 minutes. The enzyme treated potato strips were drained, then blanched using steam in a M-6 Dixie Vegetable Blancher/Cooler (Dixie Canning Company, Athens Ga., 30603) for 30 seconds. The hot steam blanched potato strips were placed directly on perforated aluminum tray and put into an impingement oven (Impinger® I, Model No. 1240 from Lincoln Food Service Products, Inc., Fort Wayne, Ind.) set at 135° C./275° F. Oven belt speed was set at 27 minutes. Every 5 minutes, the tray was shaken to stir the potato strips to allow for even drying. The process yielded approximately 129 grams of fat-free potato strips, with a light texture, approximately 90% of the strips puffed into almost cylindrical shape, giving them the appearance of crispy French fries. The fat-free potato strips were judged by trained sensory professionals to have a very rich buttery flavor, crisp light texture and appetizing appearance.

Example 24

Impingement oven for initial dry, then pulsing fluid bed dryer for Final Regular Fat Free Potato Chips: Atlantic Variety chipping potatoes were peeled and sliced using a Dito Dean vegetable slicer with a C2 blade, to achieve slice thicknesses of approximately 1.60 mm. After slicing, 1000 grams of the raw potato slices were rinsed for under 65° F. running water for 15 seconds. Then the rinsed slices were held in a solution containing 1000 grams water (43° C./110° F.), 10 grams bacterial amylase (Lot No. ALI05175-04, American Laboratories, Inc.), 10 grams calcium chloride solution (32% solution Calcium Chloride from DSM Food Specialties) for 3 minutes. The enzyme treated potato slices were drained, then blanched in 87° C./190° F. water containing 2% Cargill Sea Salt (3000 g cold water, plus 60 g. salt) for 1 minute before draining. The blanched potato slices were placed directly on the belt of and impingement oven set at 176° C./350° F., and dried for 1 minute to reduce the moisture content to 50%, then the chips were layered to a bed depth of 3 inches, then placed into an industrial Aeropulse® pulsed-air fluid bed processor (Aeroglide Corporation, Raleigh, N.C. 27626) set at 148° C./300° F. for 5 minutes. The process yielded approximately 200 grams of fat free potato chips, which were cooled and packaged. The potato chips were evaluated by trained sensory professionals and were noted to have a pleasant cooked potato flavor, golden color, and light crisp texture.

Example 25

Wavy or Ripple Fat-Free Potato Chips: Atlantic variety potatoes were peeled and sliced on a mandolin corrugated blade so that slices approximately 2 mm height at the thickest point and 1.65 mm at the thinnest point were formed very similar in appearance, shape and thickness to potato chips marketed currently under the names of "wavy" or "Ripple" chips. After slicing, 500 grams of these the raw potato slices were rinsed for under 65° F. running water for 15 seconds. Then the rinsed slices were held in a solution containing 500 grams water (43° C./110° F.), 5 grams bacterial amylase (Lot No. ALI05175-04, American Laboratories, Inc.), 5 grams calcium chloride solution (32% solution Calcium Chloride from DSM Food Specialties) for three minutes. The enzyme treated potato slices were drained, then blanched using steam in a M-6 Dixie Vegetable Blancher/Cooler (Dixie Canning Company, Athens Ga., 30603) by exposing the slices directly to steam for 30 seconds at atmospheric conditions. Blanched potato slices were placed directly on and put into an impingement oven (Impinger® I, Model No. 1240 from Lincoln Food Service Products, Inc., Fort Wayne, Ind.) set at 140° C./285° F. Oven belt speed was set at 24 minutes. The process yielded approximately 110 grams of fat-free potato chips, which were then cooled and packaged. The potato chips were evaluated by trained sensory professionals and were noted to have a pleasant cooked potato flavor, golden color, and light crisp texture.

Example 26

Puffy Potato Chips: Yukon Gold potatoes were peeled and cut into slices approximately 2 mm thick. Approximately 750 grams of these raw potato strips were rinsed under 65° F. running water for 15 seconds. Then the rinsed slices were held in a solution containing 500 grams water (43° C./110° F.), 5 grams bacterial amylase (Lot No. ALI05175-04, American Laboratories, Inc.), 5 grams calcium chloride (32% solution Calcium Chloride from DSM Food Specialties) for 3 minutes. The enzyme treated potato slices were drained, then blanched in 87° C./190° F. water containing 2.5% Cargill Sea Salt (3000 g water, plus 75 g salt) for 1 minute 30 seconds before draining Blanched potato slices were placed directly on a wire belt and ran through an impingement oven (Impinger® I, Model No. 1240 from Lincoln Food Service Products, Inc., Fort Wayne, Ind.) set at 140° C./285° F. Oven belt speed was set at 9 minutes for the initial pass, then the potato slices were ran through again for 6 minutes. The process yielded approximately 135 grams of fat-free potato chips, with a light texture, approximately 90% of the chips puffed into a thicker shape with a pillow-like appearance and hollow center. These puffy, fat-free potato chips were judged by trained sensory professionals to have a very rich buttery flavor, crisp light texture, and appetizing appearance.

Example 27

Fat-Free Sweet Potato Chips: Organic Japanese Sweet Potatoes were peeled and sliced into slices approximately 1.8 mm thick. After slicing, 1000 grams of these raw sweet potato slices were rinsed under 65° F. running water for 15 seconds. Then the rinsed slices were blanched in 87° C./190° F. water containing 2% Cargill Sea Salt (2000 g cold water, plus 40 g salt) for 1 minute 30 seconds before draining Blanched slices were placed directly on chain belt of impingement oven (Impinger® I, Model No. 1240 from Lincoln Food Service Products, Inc., Fort Wayne, Ind.) set at 140° C./285° F. Oven belt speed was set at 14 minutes. The process yielded approximately 230 grams of fat-free sweet potato chips, which were cooled and packaged. The sweet potato chips were evaluated by trained sensory professionals and were noted to have a very pleasant sweet flavor, bright orange color, and light crisp texture.

Example 28

Use of Rotary or Rotary Drum Dryer as the first step of the cooking process: Chipping potatoes were washed, peeled, sliced to approximately 1.55 mm thickness, and then washed and exposed to a solution containing bacterial amylase (Lot No. AL105175-04, American Laboratories, Inc.), and calcium chloride solution (32% solution Calcium Chloride from DSM Food Specialties). Next the enzyme treated potato slices were drained followed by blanching at 87° C./190° F. water containing 2% Cargill sea salt before then again draining. Then the blanched potato slices were cooled and stored. Several samples of the sliced potatoes were tested on an Omni Mark moisture analyzer available from Denver Equipment Company before and after the dehydrating step. The analyzer indicated that raw enzyme treated potato slices had a moisture level between 80% and 85% after blanching and just prior to drying.

The sliced potatoes were then placed in bulk form inside a rotary drum dryer provided by Spray Dynamics and partially dehydrated in mass quantity at a temperature of about 300° F. for about 10 minutes. The partially dehydrated slices were then removed from the rotary dryer and visually tested for quality, color, texture, breakage, smell and flavor. Surprisingly, all slices had an excellent texture, color, flavor, smell, and, even, more surprisingly minimal, if any, breakage, sticking or any other visual impairment was noticed. The drying was uniform and all slices had similar color and a consistent level of dehydration.

The test was repeated for several times at temperatures ranging between about 275° F. and about 350° F. and for periods as low as about 5 and as high as about 14 minutes. The visual results were all surprisingly good as in the first trail and consistent among trials.

Moisture levels following the dehydrating processes of various lengths between about 5 to about 14 minutes produced snack food slices with a moisture content ranging between about 40% and 70%.

To further test the efficacy of the teachings of the present invention an additional test was conducted using the rotary drum dryer available from Spray Dynamics. Potato slices without enzyme treatment were placed in the drum dryer in the same manner as explained above and partially dehydrated at 300° F. for periods as high as about 12 minutes. The process consistently produced less preferable results as, following the dehydrating step, the slices had a color, texture, quality, flavor and odor deemed to be commercially undesirable. The drying was inconsistent. Some slices had dried out to a hard consistency similar to and/or as of dehydrated potatoes. Other slices, however, were totally or partially wet or even burnt totally or around the edges. It is believed that food products containing high levels of starch will be greatly enhanced by using an enzyme treatment as the enzyme treatment possibly breaks down the sugars on the surface of the food slice.

Then, the pretreated dehydrated potato slices of potatoes processed in accordance with the teachings of the present invention were used to produce potato chips that have same texture, crunchiness, color, taste and mouth feel as conventionally deep fried potato chips. Pretreated potato slices cooked at a temperature of about 300° F. for about 8 minutes containing approximately 51% moisture (Pretreated Dehydrated Potato Slices) were used in the following tests.

Example 28A

Approximately 5,000 grams of the Pretreated Dehydrated Potato Slices were poured onto the opening conveyer belt of a fluidized bed dryer available from Witte Company and were further massively subjected to heat at a temperature of about 325° F. for about 6 minutes. The air velocity was between about 300 to about 350 cfm. The cooked Pretreated Dehydrated Potato Slices were then left to cool down to ambient temperature (80° F.). The resulting potato chips, included some air pockets/blistering resembling conventional fried chips, and had excellent texture, mouth feel, taste, color, and crunchiness totally commensurate with or better than that of their counterpart potato chips that are made through conventionally deep frying methods. The trial yielded approximately 1,990 grams of fat free potato chips.

Example 28B

Approximately 1,500 grams of the Pretreated Dehydrated Potato Slices were placed in a multiple layer configuration on the conveyer belt of an industrial Air Force® impingement oven (Heat and Control Company, Hayward, Calif. 94545) creating a bed depth of 1 inch, then processed for 5.5 minutes at 148° C./300° F. The process yielded approximately 660 grams of fat-free potato chips, which were cooled and packaged. The potato chips were evaluated by trained sensory professionals and were noted to have a pleasant cooked potato flavor, golden color, and light crisp texture.

Example 28C

Approximately 2,000 grams of the Pretreated Dehydrated Potato Slices were processed further in a multi-layer format using an industrial Aeropulse® pulsed-air fluid bed processor (Aeroglide Corporation, Raleigh, N.C. 27626) set at 148° C./300° F. for 5 minutes. The process yielded approximately 830 grams of fat free potato chips, which were cooled and packaged. The potato chips were evaluated by trained sensory professionals and were noted to have a pleasant cooked potato flavor, golden color, and light crisp texture.

Example 28D

Approximately 1000 grams of the Pretreated Dehydrated Potato Slices were further processed using a convection oven (Model #6203, Lincoln Steam'r Oven, Lincoln Food Service Products, Fort Wayne, Ind.). The potato slices were placed on perforated trays and cooked in the oven for 12 minutes at 148° C./300° F. until the products were fully dried. The trial resulted in approximately 400 grams of finished fat free potato chips. The potato chips were evaluated by trained sensory professionals and were noted to have a pleasant cooked potato flavor, golden color, and light crisp texture.

Example 28E

Approximately 2000 grams of the Pretreated Dehydrated Potato Slices were further processed in a stationary tray dryer (National Dryer Machinery Company, Philadelphia, Pa.), by placing the potato slices in a layer approximately ¾ inch deep and drying for 16 minutes at a temperature of 148° C./300° F. The trial resulted in approximately 810 grams of fat free potato chips. These chips were evaluated by trained sensory professionals and were noted to have a bright golden color, excellent potato chip flavor and light crisp texture.

Example 29

Impingement oven for initial dry, then vibrating fluidized bed dryer for final Regular Fat Free Potato Chips: Snowden variety chipping potatoes were washed and sliced using a Ditto Dean vegetable slicer with a C3 blade, to achieve slice thicknesses of approximately 1.60 mm. After slicing, 3.95 lbs. of the raw potato slices were rinsed for under 65° F. running water for 15 seconds. Then the rinsed slices were held in a solution containing 3000 grams water (43° C./110° F.), 30 grams bacterial amylase (Lot No. ALI05175-04, American Laboratories, Inc.), 30 grams calcium chloride solution (32% solution Calcium Chloride from DSM Food Specialties) for 3 minutes. The enzyme treated potato slices were drained, then blanched using steam in a M-6 Dixie Vegetable Blancher/Cooler (Dixie Canning Company, Athens Ga., 30603) for 40 seconds. The blanched potato slices were placed directly on the belt of and impingement oven set at 176° C./350° F., and dried for 5 minutes to reduce the moisture content to 36%, then the chips were layered to a bed depth of 2 inches, then placed into an lab model vibrating fluid bed processor (Carrier Vibrating Equipment, Inc., Louisville, Ky. 40213) with a drilled hole type plate, and dried/cooked at 160° C./320° F. for 2 minutes. The process yielded approximately 1 pound of fat free potato chips, which were cooled and packaged. The potato chips were evaluated by trained sensory professionals and were noted to have a pleasant cooked potato flavor, golden color, and light crisp texture.

Example 30

Steam Blanch, then vibrating fluidized bed dryer for entire drying step on Fat Free Sweet Potato Chips: Common variety sweet potatoes were washed, peeled, and sliced using a Ditto Dean vegetable slicer with a C3 blade, to achieve slice thicknesses of approximately 1.80 mm. After slicing, 3.0 lbs. of the raw sweet potato slices were rinsed for under 65° F. running water for 15 seconds. Then the rinsed slices were drained and blanched using steam in a M-6 Dixie Vegetable Blancher/Cooler (Dixie Canning Company, Athens Ga., 30603) for 50 seconds. The blanched sweet potato slices were rinsed under cold water spray for 3 minutes, drained then stored in plastic bags in a cooler overnight. The blanched sweet potato slices were layered to a bed depth of 2 inches in an lab model vibrating fluid bed processor (Carrier Vibrating Equipment, Inc., Louisville, Ky. 40213) with a drilled hole type plate, and dried/cooked at 176° C./350° F. for 4 minutes. Temperature of the processor was then reduced to 160° C./320° F. and product was cooked for an additional 2 minutes before the processor temperature was reduced to 148° C./300° F. for additional two minutes of final drying/cooking time. The sequential temperature reductions allowed for a controlled drying process, maintaining product temperature below 148° C./300° F. at the final stages of drying when no evaporative cooling was taking place to prevent product browning and controlling caramelization of natural sugars present in the product. This controlled process yielded approximately 0.75 of fat-free sweet potato chips, which were cooled and packaged. The sweet potato chips were evaluated by trained sensory professionals and were noted to have a very pleasant sweet flavor, bright orange color, and light crisp texture.

The above process was repeated a number of times with sweet potatoes that were additionally treated with calcium chloride, amylase enzyme and the combination of the two yielding desired products with great color, texture and taste.

Additionally, pears, apples, squash, and a varieties of carrots including yellow, orange, white and purple carrots were processed in similar procedures as above all resulting in excellent products having great taste, color and texture.

Example 31

Steam Blanch then vibrating fluidized bed dryer for entire drying step on Fat Free Potato Sticks: Common Russet potatoes were washed, peeled, and sliced using a Ditto Dean vegetable slicer with an AS-4 blade, to achieve julienne slice or stick shape with 2.0 mm square, and average length of 8 cm. After slicing, 2.80 lbs. of the raw potato sticks were rinsed for under 65° F. running water for 15 seconds. Then the rinsed potato sticks were drained, held in a solution containing 3000 grams water (43° C./110° F.), 30 grams bacterial amylase (Lot No. ALI05175-04, American Laboratories, Inc.), 30 grams calcium chloride solution (32% solution Calcium Chloride from DSM Food Specialties) for 3 minutes. The enzyme treated potato sticks were drained, and blanched using steam in a M-6 Dixie Vegetable Blancher/Cooler (Dixie Canning Company, Athens Ga., 30603) for 55 seconds. The blanched potato sticks were rinsed under cold water spray for 3 minutes, drained, then potato sticks were marinated in a in a solution containing 1000 g. water, 75 grams of tomato juice, 10 grams lemon juice, 10 grams carrot juice plus 10 grams of salt in a cooler overnight. The following day, the marinated potato sticks were drained and layered to a bed depth of 2 inches in an lab model vibrating fluid bed processor (Carrier Vibrating Equipment, Inc., Louisville, Ky. 40213) with a drilled hole type plate, and dried/cooked at 160° C./320° F. for 6 minutes. Temperature of the processor was then reduced to 148° C./300° F. and product was cooked for an additional 2 minutes before the processor temperature was reduced to 140° C./285° F. for additional two minutes of final drying time. The sequential temperature reductions allowed for a controlled drying process, maintaining product temperature below 148° C./300° F. at the final stages of drying when no evaporative cooling was taking place to prevent product browning and controlling caramelization of natural sugars present in the product. This controlled process yielded approximately 0.60 of fat-free potato sticks, which were cooled and packaged. The resulting product was very bright golden in color, with a pleasant, slightly salty buttery potato flavor and having an excellent crispy light texture.

Example 32

Fat-Free Tortilla Chips Using vibrating fluidized bed dryer for final cooking: Commercial 6 inch diameter white corn tortillas were purchased at the local grocery store, each tortilla was cut into eight wedges or triangles. Approximately 500 grams of these tortilla pieces were held in a solution containing 3000 grams water (43° C./110° F.), 30 grams bacterial amylase (Lot No. ALI05175-04, American Laboratories, Inc.), 30 grams calcium chloride solution (32% solution Calcium Chloride from DSM Food Specialties) for 3 minutes. The enzyme treated tortilla pieces were drained, then layered to a bed depth of 1½ inches and placed into a lab model vibrating fluid bed processor (Carrier Vibrating Equipment, Inc., Louisville, Ky. 40213) with a drilled hole type plate, and dried/cooked at 160° C./320° F. for 7 minutes. The process yielded approximately 200 grams of tortilla chips, which were cooled and packaged. The tortilla chips were evaluated by trained sensory professionals and were noted to have a pleasant cooked tortilla flavor, a very light golden color, smooth appearance, and light crisp texture. When compared with a sample processed in a similar manner but without the enzyme treatment, the sample processed using the procedure of the present invention was noted to be much lighter in texture and exhibited a lighter crunch and crispiness. The sample processed without enzyme treatment but rather held in just water for 3 minutes was tough and less crispy than the one which was produced using the process of the present invention.

Example 33

Application of Oil Via Oil-Water Emulsion

Potatoes were washed and sliced to an average slice thickness of 1.95 mm. The sliced potatoes were washed with water and then placed in an amylase enzyme solution formed by adding 4945 grams (about 10.9 lbs) of amylase (Specialty Enzymes & Biotechnologies Co., SEBamyl L Liquid Beta-Amylase) and 3265 grams (about 7.2 lbs) of calcium chloride (Nelson-Jameson, Inc., Food-Grade 32% Calcium Chloride) to 397 liters (about 105 gallons) of warm water (41.1° C., about 106° F.). The potato slices were immersed in the amylase enzyme solution for about 3 minutes before draining After draining, the enzyme-treated potato slices were blanched in 87.8° C. (about 190° F.) water for 90 seconds. The blanched potato slices were dipped into cold water for about 15 seconds to halt cooking, then drained.

An oil-water emulsion was formed by adding 3.8 liters (about 1 gallon) of corn oil to 185 liters (about 49 gallons) of water. A circulation pump emulsified the oil and water mixture to a cloudy, even, bluish-white texture to form an oil-water emulsion. Tests of the oil-water emulsion via volumetric weighing showed an oil content at the surface of about 28% by weight. The enzyme-treated and blanched potato slices were immersed in the oil-water emulsion mixture for a period of about 5 seconds to about 10 seconds at a depth of about one inch on a moving belt. The oil-treated slices were dried and cooked as follows: Dryer stage 1 (batch mode): Food pieces were dried at 380° F. for 7 minutes, and then at 360° F. for another 7 minutes in a vibrating fluidized bed dryer, for a total of 14 minutes in stage 1. The bed is drilled with 3/16" diameter holes spaced 1" apart. Vibration angle is 3 degrees backwards from vertical. Process air (a measure of how much air is flowing through the dryer) measures a 3" pressure drop. Pressure in the plenum (a measure of air velocity through the holes) is 9.75".

Dryer stage 2 (batch mode): Food pieces were dried at 260-290° F. for 13 minutes in a vibrating fluidized bed dryer. The bed is drilled with 1/8" diameter holes paced 1" apart. Vibration angle is vertical. Process air (a measure of how much air is flowing through the dryer) measures a 0.5" pressure drop. Pressure in the plenum is 4.5-5".

The fractional carryover rate of the oil-water emulsion to the potato slices was measured as about 7% and the potato solids fraction was determined to be 21%. Using Equation [9], described above, the predicted final oil content of the potato slices (chips) was about 9 wt % oil, which was confirmed by laboratory analysis. The final moisture content was about 3 wt-%.

Example 34

Oil Application Via Oil-Water Emulsion

Potatoes are washed and sliced to an average slice thickness of 1.7 mm. The sliced potatoes are washed with water and then placed in an amylase enzyme solution formed by adding 4945 grams (about 10.9 lbs) of amylase (Specialty Enzymes & Biotechnologies Co., SEBamyl L Liquid Beta-Amylase) and 3265 grams (about 7.2 lbs) of calcium chloride (Nelson-Jameson, Inc., Food-Grade 32% Calcium Chloride) to 397 liters (about 105 gallons) of warm water (41.1° C., about 106° F.). The potato slices are immersed in the amylase enzyme solution for about 3 minutes before draining After draining, the enzyme-treated potato slices are blanched in 87.8° C. (about 190° F.) water for 90 seconds. The blanched potato slices are dipped into cold water for about 15 seconds to halt cooking, then drained.

An oil-water emulsion is formed by adding 40 liters of sunflower oil to 160 liters of water. A homogenizer produced an even oil-water emulsion mixture that was 25% oil by volume. The enzyme-treated and blanched potato slices of thickness of 1.7 mm are immersed in the 25% oil emulsion for a period of about 5 seconds to about 10 seconds.

Dryer stage 1 (batch mode): Food pieces are dried at 380° F. for 7 minutes, and then at 360° F. for another 7 minutes in a vibrating fluidized bed dryer, for a total of 14 minutes in stage 1. The bed is drilled with 3/16" diameter holes spaced 1" apart. Vibration angle is 3 degrees backwards from vertical. Process air (a measure of how much air is flowing through the dryer) measures a 3" pressure drop. Pressure in the plenum (a measure of air velocity through the holes) is 9.75".

Dryer stage 2 (batch mode): Food pieces are dried at 260-290° F. for 13 minutes in a vibrating fluidized bed dryer. The bed is drilled with 1/8" diameter holes paced 1" apart. Vibration angle is vertical. Process air (a measure of how much air is flowing through the dryer) measures a 0.5" pressure drop. Pressure in the plenum is 4.5-5".

The fractional carryover rate of the sunflower oil-water emulsion to the potato slices is measured as 9% and the potato solids fraction is determined to be 19%. The final oil content of the potato slices (chips) is determined to be about 12 wt-% oil. The final moisture content is about 1-3 wt-%.

Example 35

Sweet Potato Chips Using Oil-in-Water Emulsion

Sweet potatoes are washed and sliced to an average slice thickness of 2 mm. The slices were placed in a solution formed by adding 12 lbs of sea salt (1.4 wt-%) and 1.3 lbs (0.15 wt-%) of calcium chloride (Nelson-Jameson, Inc., Food-Grade 32% Calcium Chloride) to 397 liters (about 105 gallons) of warm water (41.1° C., about 106° F.). The sweet potato slices are immersed in the salt solution for about 5 minutes before draining After draining, the enzyme-treated potato slices are blanched in 85° C. (about 185° F.) water for 90 seconds. The blanched potato slices are dipped into cold water for about 15 seconds to halt cooking, then drained.

An oil-water emulsion is formed by adding 1 gal of corn oil to 55 liters of water. A homogenizer produced an oil-water emulsion mixture that was 35% oil by volume at the surface. The blanched potato slices were immersed in the emulsion mixture just below the surface for a period of 5 to 10 seconds at room temperature.

Dryer stage 1 (batch mode): Potato slices were dried at 345° F. for 7 minutes in a vibrating fluidized bed drier, he bed is drilled with 3/16" diameter holes spaced 1" apart. Vibration angle was 3 degrees backwards from vertical. Process air (a measure of how much air is flowing through the dryer) measured a 2.5" pressure drop. Pressure in the plenum (a measure of air velocity through the holes) was 7.55".

Dryer stage 2 (batch mode): Potato slices were dried at 250° F. for 7 minutes in a vibrating fluidized bed dryer. The bed is drilled with 1/8" diameter holes paced 1" apart. Vibration angle is vertical. Process air (a measure of how much air is flowing through the dryer) measured a 1.2" pressure drop. Pressure in the plenum is 4.5-5".

The fractional carryover rate of the oil-water emulsion to the sweet potato slices (chips) is measured as 6.5% and the potato solids fraction is determined to be 23%. The final oil content of the sweet potato slices was calculated to be about 10 wt % oil. The final moisture content was about 3 wt-%.

Example 37

Crispness Tests. Vegetable snack chips are favored for their crispy, crunchy bite which is particularly characteristic of traditional fried chips. Crispness and crunchiness can be quantified with an instrument that records the force required to break chips as well as their stiffness prior to failure. The ratio of increased resistance to increased flexure or deformation is Young's modulus (also called the elastic modulus). Vickers and Christensen (Vickers, Z. M. and Christensen, C. M. 1980. Relationship between sensory crispness and other sensory and instrumental parameters. Journal of Texture Studies 11: 291-307) found that, of instrumental measurements, Young's modulus had the highest correlation to crispness in foods. These authors showed that it is also helpful to record the sound made when the chip breaks since they found crispness was very closely related to loudness during fracture. The importance of snack food sound is underscored by Vickers' (Vickers, Z. M. 1983. Pleasantness of Food Sounds. Journal of Food Science 48: 783-786) observation that pleasantness of food sounds was highly correlated with descriptors 'crisp' and 'crunchy.'

Accordingly, to be perceived as crisp and crunchy, snack food products need to have an adequate stiffness, (as reflected in Young's modulus) and to emit at least a certain level of sound upon breaking. At the same time, snack food products should not require so great a force as to cause mouth pain or injury. To evaluate crispness, samples were fractured on a TA.XT Plus Texture Analyzer (Stable Microsystems, Godalming, U.K.) fitted with a TA-101 Chip Rig and a 5 kg load cell. The TA-101 rig has 2 cm diameter by 2 cm tall pipe which supports the chip in a horizontal position. A 5 mm ball descended at 1 mm/sec until 5 g resistance was sensed, then it continued 30 mm and the force of resistance was recorded as the chip bent and fractured. A Stable Microsystems Audio Envelope Detector was used to record the sound produced during fracture.

To demonstrate the crispness/crunch of various snack products, representative samples were analyzed to measure the force required and acoustic levels resulting from fracturing chips. The analysis methods consisted of testing samples of chips listed in Table 3 below, labeled A through M, with samples A, B, C, D, L and M being produced in accordance to the present invention as described in examples 28, 24, 25, 26, 27 and 5 respectively, with retail samples E, F, G, H, I J, and K purchased at a local grocery store in Lincoln, Nebr. Representative chips were selected from each sample, handled, and analyzed in a consistent manner to obtain the data presented in Tables 3, 4, 5 and 6.

From each sample of about 25 chips, 9 chips were selected for the test. The more uniform chips were selected for measurement, because chips were variable in thickness and blistering. The nine selected chips were fractured and measurements were made of the force required to fracture each chip as the probe broke each chip while moving toward the chip at a uniform speed of 1 mm/second. Exponent software was used to generate a plot of force (Newtons) against distance (mm), and to determine (1) the initial slope, which is Young's Modulus, as discussed above, (2) the peak force required to fracture the chip and (3) peak loudness upon fracture of the chip. Excel Spreadsheet software was used to calculate means, standard deviation and coefficient of variation. Prior to this objective testing, samples A, B, C, D, L and M were all tasted and found to be favorably crisp and crunchy and samples E through K were determined to be within the indicated shelf life on the original package.

Graphs plotting force (N) against distance (mm) traveled by the probe were generated for each force measurement. Each of these plots depict a series of increases in resistance to applied force as the chip bends under pressure from the probe just prior to fracture. The probe is moving toward the chip at a constant velocity of 1 mm per second (1 mm/sec). In each case, the increase in resistance to applied force is followed by a sudden drop in resistance to such force as the chip breaks. In most cases, the chips fracture and break in a series of fractures. The first fracture, however, is the focus for determining the peak force required to fracture the chip. The peaks created in this way, characterize the chip's texture, i.e., how much does the chip resist bending before breaking, how far will it bend before breaking and at what distance and force does it break. These quantities 'fingerprint' fracture properties and their crispness and crunchiness. The sudden loss in resistance (after the force peaks) is accompanied by a recorded sound event since the chip is set vibrating by the sudden loss in deformation and stress. As noted above, typical graphs include 2 to 4 major force peaks and a corresponding number of sound peaks. The slope prior to each peak estimates the aforementioned Young's modulus, which is a good estimate of crunchiness. Since the samples tested were all crisp, any of the chips with an average Young's modulus greater than 3.5 N/mm are clearly crisp. In accordance with the present invention, it is preferable to product a snack food product with a Young's modulus of about 3.5, more preferably about 4.0, even more preferably 4.5, and even more preferably about 5.0 N/mm. It is also preferable to have a snack food product that will fracture at about 12, preferable about 10 and more preferably about 9 N of force applied to the chip so that the snack food product is crunchy but does not require so much force so that is hurts to eat the product.

The results of testing are provided in Tables 3-6 below. The resulting sound levels listed in Table 5 below do not have units as they are a relative number.

TABLE 3

Mean average for greatest force, sound and initial Young's modulus from the data presented in Tables 4-6.

| Sample | Force Peak (N) | Peak Sound | Young's Modulus (N/mm) |
|---|---|---|---|
| A - Thin chip of the present invention | 3.95 | 4097 | 13.7 |
| B - Wavy chip of the present invention | 4.58 | 3744 | 8.5 |
| C - Puffy chip of the present invention | 6.65 | 5968 | 19.7 |
| D - Thick chip of the present invention | 7.12 | 4139 | 15.7 |
| E - Lays ® Classic | 3.19 | 927 | 5.7 |
| F - Lays ® Fat Free with OLESTRA ™ | 2.59 | 1142 | 4.2 |
| G - Lays ® Kettle Cooked Chips | 5.14 | 1616 | 10.8 |
| H - Kettle ™ Chips (Kettle Brand) | 7.45 | 1447 | 14.2 |
| I - Low Fat Kettle ™ Krisp | 5.65 | 23229 | 9.9 |
| J - Kettle ™ Brand Bakes | 6.23 | 3886 | 10.2 |
| K - Terra ® Yukon Gold | 9.06 | 10513 | 18.3 |
| L - Sweet potato chips of the present invention | 8.77 | 6943 | 18.9 |
| M - Beet chips of the present invention | 3.62 | 3758 | 7.3 |

TABLE 4

Maximum Force (N).

| | REP1 | REP2 | REP3 | REP4 | REP5 | REP6 | REP7 | REP8 | REP9 | MEAN | % Coefficient of Variation |
|---|---|---|---|---|---|---|---|---|---|---|---|
| A | 1.20 | 3.77 | 1.62 | 2.84 | 7.39 | 3.45 | 5.41 | 5.29 | 4.53 | 3.95 | 50% |
| B | 4.05 | 5.65 | 3.64 | 5.09 | 2.19 | 2.68 | 5.89 | 4.64 | 7.38 | 4.58 | 36% |
| C | 7.47 | 6.78 | 2.99 | 8.60 | 8.55 | 4.63 | 5.51 | 8.04 | 7.30 | 6.65 | 29% |
| D | 8.14 | 8.05 | 7.11 | 7.76 | 4.86 | 6.38 | 10.37 | 7.63 | 3.79 | 7.12 | 27% |
| E | 2.29 | 5.03 | 2.54 | 2.35 | 3.92 | 5.96 | 1.52 | 2.51 | 2.60 | 3.19 | 46% |
| F | 2.77 | 1.74 | 2.19 | 2.54 | 1.97 | 2.80 | 4.32 | 2.31 | 2.59 | 2.59 | 29% |
| G | 4.65 | 4.30 | 4.88 | 3.56 | 6.44 | 4.21 | 4.51 | 5.81 | 7.89 | 5.14 | 26% |
| H | 9.69 | 7.43 | 8.67 | 9.85 | 5.87 | 8.16 | 4.41 | 6.64 | 6.37 | 7.45 | 24% |
| I | 5.56 | 3.73 | 6.55 | 4.19 | 4.50 | 8.97 | 8.72 | 3.56 | 5.03 | 5.65 | 36% |
| J | 2.06 | 7.56 | 6.94 | 11.94 | 6.39 | 2.95 | 8.12 | 4.00 | 6.16 | 6.23 | 48% |
| K | 11.68 | 9.37 | 10.75 | 10.88 | 7.20 | 5.97 | 11.10 | 8.75 | 5.87 | 9.06 | 25% |
| L | 8.88 | 8.88 | 11.22 | 7.25 | 10.10 | 6.35 | 7.59 | 6.53 | 12.13 | 8.77 | 23% |
| M | 2.73 | 2.02 | 3.15 | 4.81 | 3.64 | 3.93 | 5.74 | 3.30 | 3.28 | 3.62 | 31% |

TABLE 5

Loudness.

| | REP1 | REP2 | REP3 | REP4 | REP5 | REP6 | REP7 | REP8 | REP9 | MEAN | % Coefficient of Variation |
|---|---|---|---|---|---|---|---|---|---|---|---|
| A | 1587 | 4402 | 2229 | 2140 | 6902 | 4266 | 7714 | 4349 | 3287 | 4097 | 51% |
| B | 4427 | 3933 | 4247 | 4741 | 1728 | 3965 | 5592 | 2412 | 2656 | 3745 | 33% |
| C | 6618 | 7134 | 5599 | 7986 | 8598 | 5215 | 2246 | 5510 | 4813 | 5969 | 32% |
| D | 5211 | 4778 | 7179 | 4753 | 2436 | 4804 | 4158 | 2361 | 1577 | 4140 | 42% |
| E | 1293 | 915 | 634 | 583 | 1198 | 1432 | 875 | 633 | 782 | 927 | 34% |
| F | 389 | 661 | 634 | 1264 | 2544 | 1202 | 1284 | 1299 | 1008 | 1143 | 55% |
| G | 2269 | 1030 | 880 | 1462 | 2242 | 810 | 1355 | 1825 | 2674 | 1616 | 42% |
| H | 1549 | 1877 | 819 | 1132 | 1839 | 1571 | 1181 | 1041 | 2020 | 1448 | 29% |
| I | 5558 | 4560 | 8370 | 1698 | 5257 | 7193 | 4318 | 3479 | 4537 | 4997 | 39% |
| J | 1538 | 2237 | 4534 | 5610 | 1539 | 4445 | 6575 | 4060 | 4441 | 3887 | 45% |
| K | 506 | 1409 | 1175 | 1626 | 1136 | 935 | 630 | 938 | 1107 | 1051 | 33% |
| L | 7600 | 6965 | 1175 | 7909 | 5915 | 4004 | 8198 | 6015 | 4132 | 6944 | 34% |
| M | 2806 | 3791 | 2668 | 3527 | 3171 | 5403 | 6226 | 2593 | 3638 | 3758 | 33% |

TABLE 6

Young's Modulus (N/mm).

| | REP1 | REP2 | REP3 | REP4 | REP5 | REP6 | REP7 | REP8 | REP9 | MEAN | % Coefficient of Variation |
|---|---|---|---|---|---|---|---|---|---|---|---|
| A | 11.3 | 18.0 | 22.2 | 5.8 | 6.5 | 16.0 | 11.8 | 15.6 | 16.5 | 13.7 | 39% |
| B | 11.3 | 8.5 | 9.6 | 4.5 | 5.0 | 10.6 | 6.9 | 8.0 | 12.4 | 8.5 | 32% |
| C | 19.1 | 18.4 | 8.9 | 28.1 | 18.6 | 22.7 | 17.7 | 27.2 | 16.5 | 19.7 | 30% |
| D | 14.3 | 16.0 | 18.3 | 16.6 | 18.1 | 7.1 | 22.0 | 14.0 | 14.8 | 15.7 | 26% |
| E | 4.9 | 16.4 | 5.0 | 4.1 | 6.3 | 5.5 | 1.1 | 3.6 | 4.1 | 5.7 | 75% |

TABLE 6-continued

Young's Modulus (N/mm).

|   | REP1 | REP2 | REP3 | REP4 | REP5 | REP6 | REP7 | REP8 | REP9 | MEAN | % Coefficient of Variation |
|---|------|------|------|------|------|------|------|------|------|------|----------------------------|
| F | 4.8  | 2.1  | 5.5  | 3.1  | 3.7  | 6.2  | 1.0  | 6.9  | 4.5  | 4.2  | 46% |
| G | 11.3 | 13.9 | 9.0  | 6.8  | 21.2 | 3.1  | 6.5  | 8.3  | 17.0 | 10.8 | 53% |
| H | 25.4 | 19.8 | 15.8 | 12.8 | 13.5 | 11.9 | 8.7  | 13.6 | 6.6  | 14.2 | 40% |
| I | 8.2  | 2.2  | 15.0 | 3.8  | 21.0 | 14.4 | 15.9 | 3.4  | 5.8  | 9.9  | 68% |
| J | 3.8  | 11.9 | 8.8  | 13.4 | 3.6  | 10.2 | 23.6 | 7.2  | 9.0  | 10.2 | 59% |
| K | 21.9 | 4.7  | 27.6 | 22.1 | 30.2 | 12.7 | 24.1 | 19.2 | 2.2  | 18.3 | 53% |
| L | 25.6 | 1.0  | 22.0 | 9.8  | 26.7 | 23.9 | 17.4 | 16.6 | 26.8 | 18.9 | 46% |
| M | 7.0  | 6.0  | 5.6  | 11.2 | 5.2  | 7.8  | 10.2 | 6.6  | 6.4  | 7.3  | 28% |

Example 38

Frozen chicken nugget. The breaded food pieces, with an intrinsic fat content of about 7%, are exposed to an oil-water emulsion at a concentration of 51% oil for 3 min under ambient conditions.

Takeup of the emulsion into the breaded food pieces is about 12% by weight.

Then the pieces—having an initial moisture content of about 65%, are cooked in a convection oven set at 350 degrees F. for 10 min and then at 300 degrees F. for 5 mins.

The final oil content of the cooked pieces is about 13 wt-% and the final moisture content is about 45%.

Example 39

Calamari (Earls). The breaded food pieces, with an intrinsic fat content of about 2%, are exposed to an oil-water emulsion at a concentration of 37% oil for 2 min under ambient conditions.

Takeup of the emulsion into the breaded food pieces is about 12% by weight.

Then the pieces—having an initial moisture content of about 40%, are cooked in a convection oven set at 350 degrees F. for 10 min and then at 300 degrees F. for 5 mins.

The final oil content of the cooked pieces is 10 wt-% and the final moisture content was 30%.

Example 40

Chili chicken cubes (Earls). The breaded food pieces, with an intrinsic fat content of about 5%, are exposed to an oil-water emulsion at a concentration of 82% oil for 90 seconds under ambient conditions.

Takeup of the emulsion into the breaded food pieces is about 10% by weight.

Then the pieces—having an initial moisture content of about 65%, is cooked in a convection oven set at 350 degrees F. for 13 min and then at 300 degrees F. for 7 mins.

The final oil content of the cooked pieces is about 13 wt-% and the final moisture content was 50%.

Example 41

Chicken tenders/fingers (Earls). The breaded food pieces, with an intrinsic fat content of about 6%, are exposed to an oil-water emulsion at a concentration of 47% oil for 10 min under ambient conditions.

Takeup of the emulsion into the breaded food pieces is about 17% by weight.

Then the pieces—having an initial moisture content of about 58%, are cooked in a convection oven set at 350 degrees F. for 12 min and then at 300 degrees F. for 6 mins.

The final oil content of the cooked pieces is about 15 wt-% and the final moisture content was 43%.

The patents, patent applications and other documents cited herein are incorporated by reference as though fully set forth. The term "about" is used to designate the uncertainly inherent in the measurement of the parameter that it modifies, as would be recognized by one skilled in the relevant art. While the processes and food products have been described in conjunction with specific embodiments thereof, it is evident that many alternatives, modifications and variations will be apparent to those skilled in the art in light of the foregoing description. Accordingly, it is intended to include all such alternatives, modifications and variations as set forth within the spirit and scope of the appended claims.

What is claimed is:

1. A process for the application of a predetermined amount of oil to food pieces, comprising:
   (a) providing a plurality of cut or shaped food pieces;
   (b) treating the food pieces with an enzyme treatment consisting of an effective amount of at least one starch-degrading enzyme;
   (c) blanching the treated food pieces to deactivate the starch-degrading enzyme;
   (d) applying an emulsion consisting essentially of oil and water to the blanched treated food pieces for a time sufficient to provide a predetermined amount of oil to the food pieces and so that the food pieces have an initial moisture level after applying the oil-water emulsion; and
   (e) reducing the initial moisture level by heating the emulsion-treated food pieces in at least one oven or drier wherein the pieces are heated in two stages at an oven/drier temperature of about 375° F. to about 400° F. for a time of about 2 to about 20 minutes, and then at an oven/drier temperature of about 200° F. to about 275° F. for a time of about 5 to about 14 minutes to a final moisture level of from about 0.2 to about 10% by weight to provide a finished food product, wherein the food pieces are not cooked/fried in hot oil, and wherein the finished food product has the taste, texture and/or appearance of a finished food product made by a step wherein the food pieces are cooked/fried in hot oil, less than 150 ppb acrylamide.

2. The process of claim 1, wherein the oil content of the oil-water emulsion is selected according to the equation:

$$f_{oe} = \frac{f_o}{f_{co}} \times f_s (1 + f_o + f_w)$$

where $f_{oe}$ is the fraction, by weight, of oil in the oil-water emulsion, $f_o$ is the fraction, by weight, of oil on the food product, $f_{co}$ is the fractional carry-over rate of oil from the oil-water emulsion onto the food pieces, $f_s$ is the fractional solids content, by weight, of the food pieces, and $f_w$ is the water fraction, by weight, in the food product.

3. The process of claim 1, wherein the oil-water emulsion applied to the food pieces comprises about 5 wt-% to about 85 wt-% oil.

4. The process of claim 1, wherein applying the oil-water emulsion to the food pieces comprises immersing the food pieces in the oil-water emulsion.

5. The process of claim 4, wherein the food pieces are immersed in the oil-water emulsion for about 2 seconds to about 15 seconds at an emulsion temperature from about 20° F. to about 150° F.

6. The process of claim 1, wherein the food pieces are fruit pieces or vegetable pieces.

7. The process according to claim 6, whereby the food pieces comprise yams, carrots, taro, potatoes, or sweet potatoes.

8. The process according to claim 7, whereby the food pieces comprise potato slices or sticks.

9. The process of claim 1, further comprising rinsing the food pieces with water and drying the food pieces prior to applying the emulsion to the food pieces.

10. The process of claim 1, further comprising preparing the emulsion by mixing oil and water by at least one of homogenizing, sonolation, agitating, or running oil and water through one or a series of pumps.

11. The process of claim 10, wherein the emulsion is prepared without an exogenous emulsifier or surfactant.

12. The process of claim 1, wherein the drying at the first stage lowers the moisture content of the food pieces to about 40 wt. to about 70 wt-%.

13. The process of claim 1, wherein the fat content of the food product is up to about 30 wt-%.

14. A food product prepared by the process of claim 1.

15. The process of claim 1 wherein the enzyme comprises amylase and/or amyloglucosidase.

16. The method of claim 1 wherein the final moisture level is reduced to about 0.5 to about 5% by weight.

17. The food product prepared by the process of claim 1 that is a potato chip.

* * * * *